United States Patent
Hoshi et al.

(10) Patent No.: US 8,304,083 B2
(45) Date of Patent: *Nov. 6, 2012

(54) HYDROPHILIC MEMBER AND PROCESS FOR PRODUCING THE SAME

(75) Inventors: Satoshi Hoshi, Tokyo (JP); Toshiaki Aoai, Kanagawa (JP); Kazuto Shimada, Shizuoka (JP); Satoshi Tanaka, Minami-Ashigara (JP); Kazuto Kunita, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 1238 days.

This patent is subject to a terminal disclaimer.

(21) Appl. No.: 12/067,607

(22) PCT Filed: Nov. 16, 2006

(86) PCT No.: PCT/JP2006/323375
§ 371 (c)(1),
(2), (4) Date: Mar. 20, 2008

(87) PCT Pub. No.: WO2007/058374
PCT Pub. Date: May 24, 2007

(65) Prior Publication Data
US 2009/0274914 A1    Nov. 5, 2009

(30) Foreign Application Priority Data

Nov. 17, 2005 (JP) ................................. 2005-332947
Nov. 17, 2005 (JP) ................................. 2005-333179
Feb. 21, 2006 (JP) ................................. 2006-044368
Sep. 21, 2006 (JP) ................................. 2006-256215

(51) Int. Cl.
*B32B 17/06* (2006.01)
*B05D 3/02* (2006.01)

(52) U.S. Cl. .................... 428/429; 427/387; 427/389.7; 427/393.5; 428/428; 428/432

(58) Field of Classification Search ................ 428/428, 428/429, 432; 427/387, 389.7, 393.5
See application file for complete search history.

(56) References Cited

U.S. PATENT DOCUMENTS

| | | | |
|---|---|---|---|
| 4,106,948 | A | 8/1978 | Cooper et al. |
| 4,147,603 | A | 4/1979 | Pacifici et al. |
| 4,168,112 | A | 9/1979 | Ellis et al. |
| 4,478,909 | A | 10/1984 | Taniguchi et al. |
| 4,539,061 | A | 9/1985 | Sagiv |
| 5,053,048 | A | 10/1991 | Pinchuk |
| 5,134,021 | A | 7/1992 | Hosono et al. |

(Continued)

FOREIGN PATENT DOCUMENTS

EP    0782015 A2    7/1997

(Continued)

OTHER PUBLICATIONS

Advisory Action issued Apr. 26, 2010, in co-pending U.S. Appl. No. 11/856,578.

(Continued)

*Primary Examiner* — D. S. Nakarani
(74) *Attorney, Agent, or Firm* — Birch, Stewart, Kolasch & Birch, LLP

(57) ABSTRACT

A hydrophilic member comprising a substrate and a hydrophilic coating film provided on the substrate, wherein the hydrophilic coating film is produced by coating a substrate with an aqueous solution containing (a) a hydrophilic polymer, (b) an alkoxide of a metal selected from the group consisting of Si, Ti, Zr, and Al, and (c) a metal complex catalyst, and heat-drying the solution applied.

8 Claims, 2 Drawing Sheets

U.S. PATENT DOCUMENTS

| | | | |
|---|---|---|---|
| 5,154,217 A | 10/1992 | Kanamaru | |
| 5,372,851 A | 12/1994 | Ogawa et al. | |
| 5,451,428 A | 9/1995 | Rupp | |
| 5,498,666 A | 3/1996 | Nambu et al. | |
| 5,518,767 A | 5/1996 | Rubner et al. | |
| 5,536,573 A | 7/1996 | Rubner et al. | |
| 5,569,573 A | 10/1996 | Takahashi et al. | |
| 5,635,572 A | 6/1997 | Ohnishi et al. | |
| 5,652,059 A | 7/1997 | Margel | |
| 5,807,636 A | 9/1998 | Sheu et al. | |
| 6,013,372 A | 1/2000 | Hayakawa et al. | |
| 6,013,855 A | 1/2000 | McPherson et al. | |
| 6,082,425 A | 7/2000 | Colom | |
| 6,099,852 A | 8/2000 | Jen | |
| 6,172,152 B1 | 1/2001 | Kim et al. | |
| 6,242,155 B1 | 6/2001 | Yamasaki et al. | |
| 6,254,634 B1 | 7/2001 | Anderson et al. | |
| 6,271,293 B1 | 8/2001 | Karuga et al. | |
| 6,368,658 B1 | 4/2002 | Schwarz et al. | |
| 6,440,569 B1 | 8/2002 | Kanamori et al. | |
| 6,455,222 B1 | 9/2002 | Fukino et al. | |
| 6,516,722 B2 | 2/2003 | Yamasaki | |
| 6,528,584 B2 | 3/2003 | Kennedy et al. | |
| 6,533,415 B2 | 3/2003 | Watanabe | |
| 6,534,237 B1 | 3/2003 | Kawamura et al. | |
| 6,555,619 B1 | 4/2003 | Kennedy et al. | |
| 6,596,346 B2 | 7/2003 | Bernard et al. | |
| 6,670,096 B2 | 12/2003 | Kawamura et al. | |
| 6,696,515 B2 | 2/2004 | Yamaya et al. | |
| 6,733,884 B2 | 5/2004 | Brown | |
| 6,793,960 B1 | 9/2004 | Michal et al. | |
| 6,852,353 B2 | 2/2005 | Qiu et al. | |
| 6,878,399 B2 | 4/2005 | Chabrecek et al. | |
| 6,893,685 B2 | 5/2005 | Qiu et al. | |
| 6,953,560 B1 | 10/2005 | Castro et al. | |
| 7,026,014 B2 | 4/2006 | Luzinov et al. | |
| 7,040,756 B2 | 5/2006 | Qiu et al. | |
| 7,067,194 B2 | 6/2006 | Mao et al. | |
| 7,291,427 B2 | 11/2007 | Kawamura et al. | |
| 7,311,970 B2 | 12/2007 | Michal et al. | |
| 7,335,185 B2 | 2/2008 | Tang et al. | |
| 7,396,582 B2 | 7/2008 | Claude et al. | |
| 7,462,437 B2 | 12/2008 | Hoshi et al. | |
| 2002/0012790 A1 | 1/2002 | Shah et al. | |
| 2002/0023565 A1 | 2/2002 | Kawamura et al. | |
| 2002/0134266 A1 | 9/2002 | Yamasaki et al. | |
| 2002/0182529 A1 | 12/2002 | Hoshi et al. | |
| 2003/0118849 A1 | 6/2003 | Yamasaki et al. | |
| 2003/0143407 A1 | 7/2003 | Yamasaki et al. | |
| 2003/0164105 A1 | 9/2003 | Tashiro | |
| 2004/0054069 A1 | 3/2004 | Kusudou et al. | |
| 2004/0059040 A1 | 3/2004 | Moller et al. | |
| 2004/0059045 A1 | 3/2004 | Kitchin et al. | |
| 2004/0060465 A1 | 4/2004 | Yamasaki et al. | |
| 2004/0191527 A1 | 9/2004 | Saitoh | |
| 2005/0069811 A1 | 3/2005 | Mitsumoto et al. | |
| 2005/0074556 A1 | 4/2005 | Kano | |
| 2005/0153239 A1 | 7/2005 | Hoshi et al. | |
| 2006/0032390 A1 | 2/2006 | Hoshi et al. | |
| 2006/0040280 A1 | 2/2006 | Lee et al. | |
| 2006/0046193 A1 | 3/2006 | Shimada et al. | |
| 2006/0046194 A1 | 3/2006 | Hoshi et al. | |
| 2006/0188813 A1 | 8/2006 | Shimada et al. | |
| 2006/0219117 A1 | 10/2006 | Hoshi et al. | |
| 2007/0006760 A1 | 1/2007 | Hoshi | |
| 2007/0092735 A1 | 4/2007 | Bruner et al. | |
| 2007/0122745 A1 | 5/2007 | Yamasaki et al. | |
| 2007/0149742 A1 | 6/2007 | Tanaka et al. | |
| 2007/0232735 A1 | 10/2007 | Tanaka et al. | |
| 2008/0004390 A1 | 1/2008 | Aoshima et al. | |
| 2008/0071054 A1 | 3/2008 | Yamasaki et al. | |
| 2008/0097017 A2 | 4/2008 | Tanaka et al. | |
| 2008/0102286 A1 | 5/2008 | Fukuda et al. | |
| 2008/0176085 A1 | 7/2008 | Tanaka et al. | |
| 2008/0177022 A1 | 7/2008 | Yamasaki et al. | |
| 2008/0207849 A1 | 8/2008 | Yamasaki et al. | |
| 2008/0226928 A1 | 9/2008 | Tanaka et al. | |
| 2008/0241557 A1 | 10/2008 | Hoshi et al. | |
| 2008/0292800 A1 | 11/2008 | Murayama et al. | |
| 2008/0300359 A1 | 12/2008 | Hoshi et al. | |
| 2009/0029179 A1 | 1/2009 | Fukuda et al. | |
| 2009/0069506 A1 | 3/2009 | Shimada et al. | |
| 2009/0239051 A1 | 9/2009 | Fukuda et al. | |
| 2009/0263605 A1 | 10/2009 | Hoshi et al. | |
| 2009/0274914 A1 | 11/2009 | Hoshi et al. | |

FOREIGN PATENT DOCUMENTS

| | | |
|---|---|---|
| EP | 0903224 A2 | 3/1999 |
| EP | 0978324 A2 | 2/2000 |
| EP | 1226976 A1 | 7/2002 |
| EP | 1 266 767 A2 | 12/2002 |
| EP | 1318027 A2 | 6/2003 |
| EP | 1516747 A1 | 3/2005 |
| EP | 1625945 A2 | 2/2006 |
| EP | 1923363 A2 | 5/2008 |
| GB | 821375 | 10/1959 |
| JP | 59-179605 A | 10/1984 |
| JP | 4-338901 A | 11/1992 |
| JP | 6-29332 B2 | 4/1994 |
| JP | 6145453 A | 5/1994 |
| JP | 6-248237 A | 9/1994 |
| JP | 7-11152 A | 1/1995 |
| JP | 7-16940 A | 1/1995 |
| JP | 9-302286 A | 11/1997 |
| JP | 11-95417 A | 4/1999 |
| JP | 2000-355674 A | 12/2000 |
| JP | 64-86101 A | 11/2002 |
| JP | 2002-361800 A | 12/2002 |
| JP | 2002-370467 A | 12/2002 |
| JP | 2003-63166 A | 3/2003 |
| JP | 2003-527978 A | 9/2003 |
| JP | 2004-256586 A | 9/2004 |
| JP | 2005-263839 A | 9/2005 |
| JP | 2007-246818 A | 9/2007 |
| WO | WO 94/23954 A1 | 10/1994 |
| WO | WO-96/29375 A1 | 9/1996 |
| WO | WO 01/18139 A1 | 3/2001 |
| WO | WO 2004/002546 A1 | 1/2004 |
| WO | WO 2004/052970 A1 | 6/2004 |
| WO | WO 2006/038540 A1 | 4/2006 |

OTHER PUBLICATIONS

Advisory Action issued Mar. 11, 2010, in co-pending U.S. Appl. No. 11/603,190.

Advisory Action issued Nov. 20, 2008, in co-pending U.S. Appl. No. 11/356,397.

Agawa et al., "Composition for non-aqueous coating materials of industrial products, is formed by blending silicon-type surface active agents with respect to polymers having hydrolysable silicon group", Apr. 13, 2006, XP-002556273, Database WPI Week 200630; AN 2006-293821.

Ando et al, "Articles painted with hydrophilic curable composition useful as top coat, comprising acrylic copolymer containing alkoxysilyl, tetraethyl silicate and/or its condensed material and curing catalyst", Dec. 26, 2000, XP-002556272, Database WPI Week 200134; AN 2001-320527.

Andou et al., "Cured product obtd. from top:coating compsn. For metal, ceramic, glass, cement etc.—comprises synthetic resin for coating e.g., partly hydrolysed condensate, and curing catalyst", Sep. 6, 1994, XP-002556275, Database Week W P199440; AN 1994-322393.

Andou et al., "Hydrophilic Curable Composition for Coating Metals, Glass etc.—Comprises Acrylic; copolymer having alkoxy:silyl gp, tetra: alkyl silicate and/or its condensn prod and curing catalyst", May 24, 1994XP-002422490, Database WPI Week 199425; AN 1994-206642.

Article of Daily Newspaper Chemical Industry, Jan. 30, 1995, and translation "Nippon Paint Developed New Polymer for Construction Paint, Reversible Between Hydrophilicity and Hydrophobicity".

European Search Report issued Apr. 22, 2008, in European Application 07018609.3, corresponding to co-pending U.S. Appl. No. 11/856,551.

European Search Report issued Jan. 20, 2010, in European Application 08004034.8, corresponding to U.S. Appl. No. 12/046,334.

European Search Report issued Jan. 4, 2010, in European Application 08004155.1, corresponding to co-pending U.S. Appl. No. 12/047,161.

Final Office Action issued Dec. 18, 2009, in U.S. Appl. No. 11/856,578.

Final Office Action issued Jun. 6, 2008, in co-pending U.S. Appl. No. 11/356,397.

Final Office Action issued Oct. 20, 2009, in co-pending U.S. Appl. No. 11/856,551.

Final Office Action issued Oct. 23, 2009, in co-pending U.S. Appl. No. 11/603,190.

Inoue et al., "Preparation of coating films for use as e.g. top coating film for car bodies—involves base coating using metallic powder and/or coloured pigment, . . . ", Nov. 25, 1997, XP-002556274, Database Week WPI 199806; AN 1998-059442.

Non-final Office Action issued Dec. 10, 2009, in co-pending U.S. Appl. No. 12/046,334.

Non-final Office Action issued Jul. 20, 2009, in co-pending U.S. Appl. No. 12/266,412.

Non-final Office Action issued Mar. 2, 2009, in co-pending U.S. Appl. No. 11/603,190.

Non-final Office Action issued Mar. 25, 2009, in co-pending U.S. Appl. No. 11/856,551.

Non-final Office Action issued May 15, 2009, in co-pending U.S. Appl. No. 12/046,334.

Non-final Office Action issued May 19, 2009, in co-pending U.S. Appl. No. 11/856,578.

Non-final Office Action issued Nov. 29, 2007, in co-pending U.S. Appl. No. 11/356,397.

Non-final Office Action issued Sep. 22, 2008, in co-pending U.S. Appl. No. 12/046,334.

XP002908012, "Multilayered coating film to protect submersible structures from adhesion of marine organism for long period of time . . ."; Sep. 28, 1999.

Article of The Chemical Daily News, dated Jan. 30, 1995 <http://telecom21.nikkei.cojp/nt21/service/CMN1000/ATCD242?cid=CIDKDB199 . . . >.

HYDROPHILIC MEMBER AND PROCESS FOR PRODUCING THE SAME

TECHNICAL FIELD

This invention relates to a surface-hydrophilic member and a process of producing the same. More particularly, it relates to a surface-hydrophilic member which maintains hydrophilic properties and exhibits superiority in durability, transparency, storage stability, anti-fog properties, anti-stain properties, visible light transmission, chemical resistance, and weatherability and to a process of producing the same in which the stability with time of a coating composition is secured.

BACKGROUND ART

Products and members with a resin film on their surface are used in a wide range of applications. They are used as fabricated and/or endowed with a function as appropriate to the intended use. In the nature of resin, such products and members generally have a hydrophobic or lipophilic surface. If stains such as oily stains adhere to their hydrophobic or lipophilic surface, they are hard to remove. If accumulated, stains can significantly impair the functions or characteristics of the products and members. Where exposed to rain or high humidity, the hydrophobic or lipophilic surface will have water droplets thereon to cause irregular reflection, which damages transmission of transparent products and members. Even products and members with an inorganic surface, such as glass and metals, cannot be seen as sufficient in resistance against adhesion of oily stains and against fogging due to adhesion of water droplets. Automotive glass and architectural glass often fails to provide an unobstructed, clear, transmitted view (or reflected view in the case of mirrors) as a result of adhesion of hydrophobic contaminants, such as urban dust, combustion products (e.g., carbon black contained in exhaust gases from automobiles), fats and oils, and substances released from some sealant materials, or water droplets. Therefore, imparting such functions as anti stain properties and anti fog properties to glass particularly in the applications described has keenly be demanded.

Assuming that stains are organic substances such as oils, achieving anti stain properties requires reducing the interaction between the stains and the surface to be protected from stains by making the surface hydrophilic or oil-repellent. Imparting anti fog properties requires making the surface spreading-wettable (capable of evenly spreading adhered water droplets, namely, hydrophilic) or water-repellent (helping remove adhered water droplets). Hence, many of anti-stain/fog materials under current studies rely for the anti stain/fog properties on surface treatment for imparting hydrophilicity, water repellency or oil repellency.

Conventionally proposed hydrophilizing surface treatments, such as an etching treatment and a plasma treatment, achieve a high hydrophilization degree, but the effect is temporary, and the hydrophilized state does not last long. The Chemical Daily, in a Jan. 30, 1995 article, reports a surface hydrophilic coat of a hydrophilic graft polymer, which is among hydrophilic resins. According to the report, the coat exhibits hydrophilicity to some extent but cannot be seen as having sufficient affinity to a substrate, still requiring improvement in durability.

Other known members with surface hydrophilicity include those utilizing titanium oxide as a photocatalyst. The hydrophilization by a photocatalyst is based on the functions of a photocatalyst for oxidatively decomposing and hydrophilizing organic matter which are developed on exposure to light. For instance, WO96/29375 discloses a hydrophilizing method, in which a photocatalyst layer is formed on a substrate and photoexcited to make the surface of the substrate highly hydrophilic. WO96/29375 says that the method is applicable to glass, lenses, mirrors, exterior materials, water-related products, and so forth to provide composite materials with high resistance to fogging and staining. Glass members having a titanium oxide coat have been used as self-cleaning architectural or automotive window glass. However, prolonged exposure to sunlight is necessary before the self-cleaning material manifests the anti stain/fog functions. The anti stain/fog properties are unavoidably deteriorated as dirt is accumulated with time. The coating film strength per se cannot be regarded as sufficient, leaving room for improvement on durability. Self-cleaning film having a plastic substrate coated with a titanium oxide layer is used as automotive side mirrors, etc. Neither is it regarded as having sufficient film strength, and a hydrophilic material with superior wear resistance has been sought for.

On the other hand, anti stain/fog materials that have most been used to produce water or oil repellency include silicone compounds and fluorine compounds. For example, JP-A 4-338901 discloses an anti stain material having a substrate coated with a silanol-terminated orqanopolysiloxane; JP-B 6-29332 proposes a material having a silane compound containing a polyfluoroalkyl group; and JP-A 7-16940 teaches a combination of a silicon dioxide-based optical thin film and a copolymer of a perfluoroacrylate and a monomer having an alkoxysilane group. Nevertheless anti stain materials of these types have insufficient anti stain properties and are hardly cleared of such stains like fingerprints, sebum, sweat, and cosmetics. Additionally, a surface treatment with a low surface energy compound such as a fluorine or silicone compound is seen as reducing in function with time. Development of anti stain/fog members with high durability has therefore been eagerly demanded.

DISCLOSURE OF THE INVENTION

An object of the present invention is to provide a surface-hydrophilic member composed of a substrate of various kinds and a highly hydrophilic surface layer excellent in wear resistance as well as transparency, storage stability, anti fog properties, anti stain properties, visible light transmission, chemical resistance, and weatherability, and a process of producing the member featuring the stability with time of a coating composition used.

Another object of the invention is to provide a surface-hydrophilic member composed of a substrate of various kinds and a hydrophilizing surface layer that not only maintains hydrophilicity but prevents growth of microorganisms and is excellent in antibacterial properties, antifungal properties, anti-algae properties as well as durability, transparency, storage stability, anti fog properties, anti stain properties, visible light transmission, chemical resistance, and weatherability, and a process of producing the same featuring the stability with time of a coating composition used.

With the above objects in mind, the present inventors have conducted researches with a particular note on the characteristics of hydrophilic graft polymers. As a result, they have found that the objects are accomplished by a surface layer having a hydrophilic polymer and a crosslinked structure obtained by hydrolysis and polycondensation of a metal alkoxide; that such a crosslinked structure-containing surface layer is easily formed by combining a hydrophilic polymer terminated with a reactive group or a hydrophilic graft polymer having reactive groups on the grafted chain with a crosslinking agent; that using a metal complex catalyst in a coating composition for the formation of such a hydrophilic surface layer brings about improved storage stability of the coating composition; and that incorporating a hydrophilic, water-soluble antimicrobial agent into the surface layer provides a surface-hydrophilic member that exhibits high antibacterial, antifungal, and anti-algae properties while retaining surface hydrophilicity. The present invention has been reached based on these findings.

The present invention provides, in its first aspect, a hydrophilic member having a substrate and a hydrophilic coating film on the substrate. The hydrophilic coating film includes a cross-linked structure produced by hydrolysis and polycondensation with an aqueous solution containing (a) a hydrophilic polymer, (b) an alkoxide of a metal selected from the group consisting of Si, Ti, Zr, and Al, and (c) a metal complex catalyst The invention provides preferred embodiments of the hydrophilic member in which:

the metal complex catalyst is formed of a metal element selected from the groups 2A, 3B, 4A, and 5A of the Periodic Table and an oxo- or hydroxyloxygen-containing compound selected from a β-diketone, a keto ester, a hydroxycarboxylic acid or an ester thereof, an amino alcohol, and an enol type active hydrogen compound;

the substrate is a glass substrate or a plastic substrate;

the hydrophilic coating film further contains an antimicrobial agent; and/or the hydrophilic polymer is represented by formula (I) and/or formula (II):

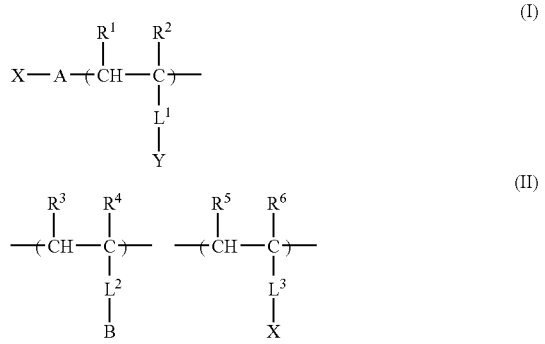

wherein $R^1$, $R^2$, $R^3$, $R^4$, $R^5$, and $R^6$ each represent a hydrogen atom or a hydrocarbon group having 1 to 8 carbon atoms; X represents a reactive group (e.g., a carboxyl group or an alkali metal salt thereof, a carboxylic acid anhydride group, an amino group, a hydroxyl group, an epoxy group, a methylol group, a mercapto group, an isocyanate group, a blocked isocyanate group, an alkoxysilyl group, an alkoxy titanate group, an alkoxy aluminate group, an alkoxy zirconate group, an ethylenically unsaturated group, an ester group, and a tetrazole group); A, $L^1$, $L^2$, and $L^3$ each represent a single bond or a linking group; Y represents —NHCOR$^7$, —CONH$_2$, —CON(R$^7$)$_2$, —COR$^7$, —OH, —CO$_2$M, —SO$_3$M, —PO$_3$M, —OPO$_3$M or —N(R$^7$)$_3$Z$^1$ (wherein R$^7$ represents an alkyl group having 1 to 18 carbon atoms, an aryl group having 6 to 18 carbon atoms or an aralkyl group having 7 to 18 carbon atoms; M represents a hydrogen atom, an alkali metal, an alkaline earth metal or an onium group; and $Z^1$ represents a halide ion); and B represents a partial structure represented by formula (III):

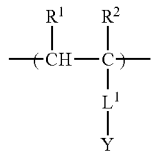

wherein R', $R^2$, L', and Y are as defined above.

The hydrophilic member of the invention is preferably automotive glass or architectural glass.

The present invention also provides, in its second aspect, a process of producing a hydrophilic member including the steps of coating a substrate with an aqueous solution containing (a) a hydrophilic polymer, (b) an alkoxide of a metal selected from Si, Ti, Zr, and Al, and (c) a metal complex catalyst and heat drying the solution applied to form a hydrophilic coating film.

The invention further provides preferred embodiments of the hydrophilic element in which:

the metal complex catalyst is Ti(acac)$_2$;

the hydrophilic coating film further contains (d) colloidal silica;

the hydrophilic coating film has a surface free energy of 70 to 95 mN/m;

the hydrophilic polymer has a hydrophilic group density of 1 to 30 meg/g;

the hydrophilic polymer has a viscosity of 0.1 to 100 cPs in a 5% aqueous solution; and/or the hydrophilic coating film has a light transmittance of at least 70%.

In the surface layer, the hydrophilic polymer is involved in a crosslinked structure resulting from hydrolysis and polycondensation of the metal alkoxide. The hydrophilic polymer is chemically bonded to the crosslinked structure via its terminal or its main chain (trunk polymer) to which a hydrophilic polymer is grafted. Therefore, the hydrophilic polymer chain has very high mobility to provide a highly hydrophilic surface.

The crosslinked structure resulting from hydrolysis and polycondensation of the metal alkoxide is a cured film with a high crosslinking density, i.e., a coating film with high strength and durability. When applied to a glass or plastic substrate, the hydrophilic surface layer always performs its function without undergoing troubles such as cracking when bent in handling.

Using the metal complex catalyst makes it possible to dry the coating film at a lower temperature, which is beneficial to suppress thermal denaturation of an antimicrobial agent added or thermal deformation of the surface layer on the substrate.

The hydrophilic member of the invention exhibits very high surface hydrophilicity and yet has a high crosslinking density in its surface cured film as a result of hydrolysis and polycondensation of the metal alkoxide. Therefore, the hydrophilic surface layer of the hydrophilic member has a property of hardly absorbing water and is thereby prevented from becoming sticky due to the environmental humidity, especially under a high humidity condition. This is effective in preventing a blocking phenomenon when the hydrophilic member is stacked one on top of another. More specifically, when the surface-hydrophilic members of the invention are stacked on each other, the hydrophilic surface layer of a surface-hydrophilic member is prevented from sticking to the back side of the adjoining hydrophilic member and being peeled when separated apart.

In a preferred embodiment, the hydrophilic member of the invention can contain a hydrophilic, water-soluble antimicrobial agent to show superior antibacterial, antifungal, and anti-algae properties without impairing the surface hydrophilicity.

The hydrophilic surface layer has no oxidatively decomposing function as with the case of using a photocatalyst, the hydrophilic member of the invention retains high antibacterial, antifungal, and anti-algae properties for an extended period of time.

BEST MODE FOR CARRYING OUT THE INVENTION

Figure 1:
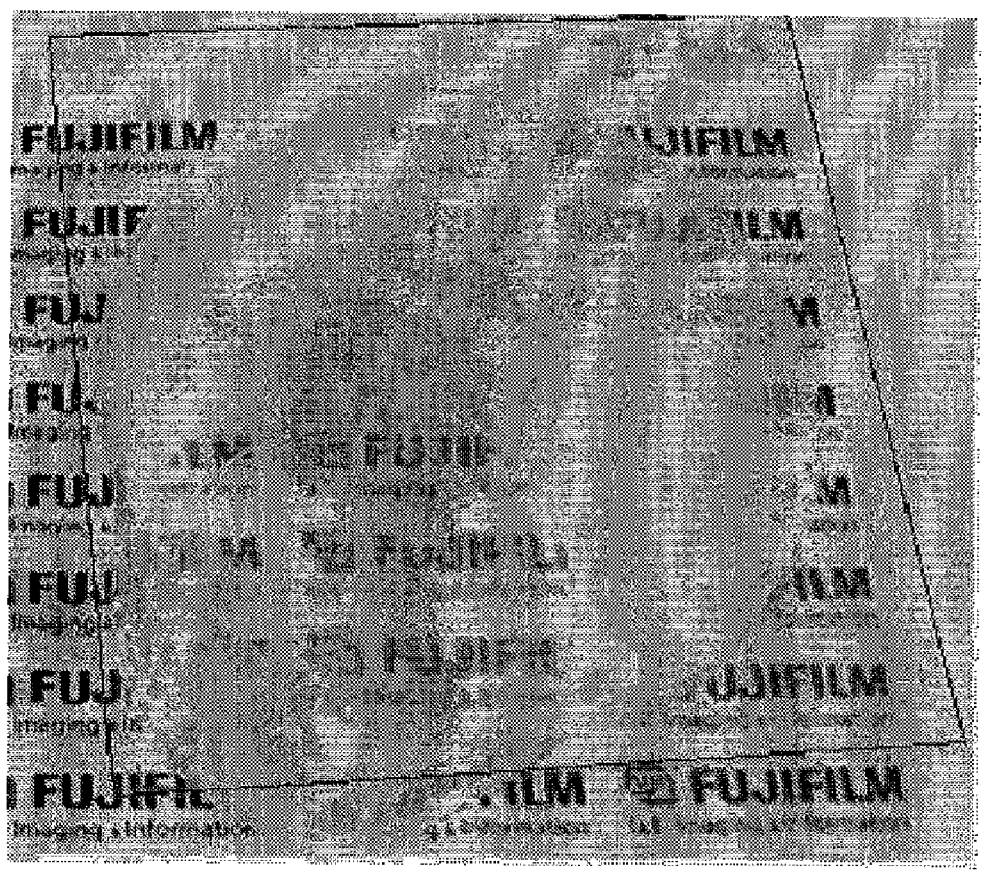
FIG. 1 is a photograph showing the anti fog properties of the hydrophilic member of Example 1.

The surface-hydrophilic member of the present invention has an appropriate substrate, such as glass or plastic, and a hydrophilic coating film (hereinafter sometimes simply referred to as a hydrophilic layer) formed on the substrate. The hydrophilic layer has a hydrophilic polymer chain and a crosslinked structure resulting from hydrolysis and polycondensation of an alkoxide of a metal selected from Si, Ti, Zr, and Al. A hydrophilic layer having such a crosslinked structure can conveniently be formed using a metal alkoxide (described infra), a compound having a hydrophilic functional group capable of forming a hydrophilic graft chain, and an appropriate catalyst. Of various metal alkoxide, preferred are silicon alkoxides in view of their reactivity and availability. Exemplary examples of the silicon alkoxides are those used as silane coupling agents.

The aforementioned crosslinked structure formed by hydrolysis and polycondensation of a metal alkoxide may be called a sol-gel crosslinked structure. Such a hydrophilic layer in which a polymer chain has large mobility with its one terminal non-fixed can easily be formed on a substrate by coating a substrate with a hydrophilic coating composition, followed by drying. The hydrophilic coating composition contains, for example, (A) a polymer of formula (I) having a reactive group (e.g., a silane coupling group) at its terminal or a polymer of formula (II) having such a reactive group in the side chain of a trunk polymer, (B) a hydrolyzable metal alkoxide, and a metal complex catalyst inducing hydrolysis and polycondensation of the metal alkoxide (B). In what follows, the components constituting the hydrophilic coating composition will be described in detail.

The hydrophilic polymer that can be used in the invention has a hydrophilic group and a group capable of forming a bond with a metal alkoxide of a metal selected from Si, Ti, Zr, and Al by, for example, the action of a catalyst. Preferred examples of the hydrophilic group include functional groups such as a carboxyl group and an alkali metal salt thereof, a sulfonic acid group or an alkali metal salt thereof, a hydroxyl group, an amido group, a carbamoyl group, a sulfonamido group, and a sulfamoyl group. The hydrophilic group may be at any position in the polymer molecule. It is preferred that the polymer have a plurality of such hydrophilic groups each bonded to its main chain either directly or via a linking group or bonded to its side chain or the side chain of its branch polymer. Examples of the group capable of forming a bond with a metal alkoxide by the action of a catalyst include reactive groups such as a carboxyl group or an alkali metal salt thereof, a carboxylic acid anhydride group, an amino group, a hydroxyl group, an epoxy group, a methylol group, a mercapto group, an isocyanate group, a blocked isocyanate group, an alkoxysilyl group, an alkoxy titanate group, an alkoxy aluminate group, an alkoxy zirconate group, an ethylenically unsaturated group, an ester group, and a tetrazole group. The polymer having a hydrophilic group and a group capable of forming a bond with a metal alkoxide by, e.g., the action of a catalyst preferably has a structure formed by vinyl polymerization of an ethylenically unsaturated group (e.g., an acrylate group, a methacrylate group, an itaconic acid group, a crotonic acid group, a cinnamic acid group, a styrene group, a vinyl group, an allyl group, a vinyl ether group or a vinyl ester group), a polycondensed structure as possessed by polyester, polyamide or polyamic acid, an addition polymer structure as possessed by polyurethane, or a naturally occurring cyclic polymer structure as observed with cellulose, amylose, chitosan, etc. Exemplary examples of the hydrophilic polymer include those represented by formula (I) and those represented by formula (II):

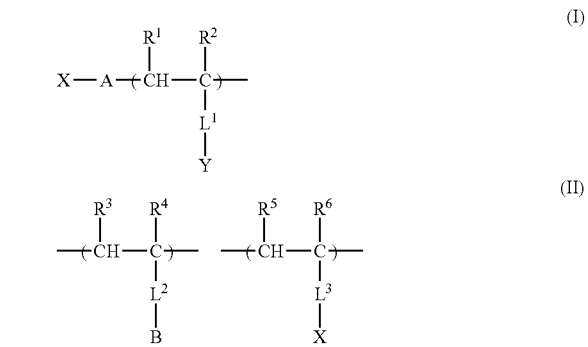

wherein $R^1$, $R^2$, $R^3$, $R^4$, $R^5$, and $R^6$ each represent a hydrogen atom or a hydrocarbon group having 1 to 8 carbon atoms; X represents a reactive group (e.g., a carboxyl group or an alkali metal salt thereof, a carboxylic acid anhydride group, an amino group, a hydroxyl group, an epoxy group, a methylol group, a mercapto group, an isocyanate group, a blocked isocyanate group, an alkoxysilyl group, an alkoxy titanate group, an alkoxy aluminate group, an alkoxy zirconate group, an ethylenically unsaturated double bond, an ester bond or a tetrazole group); A, $L^1$, $L^2$, and $L^3$ each represent a single bond or a linking group; Y represents —NHCOR$^7$, —CONH$_2$, —CON(R$^7$)$_2$, —COR$^7$, —OH, —CO$_2$M, —SO$_3$M, —PO$_3$M, —OPO$_3$M or —N(R$^7$)$_3$Z$^1$ (wherein $R^7$ represents an alkyl, aryl or aralkyl group having 1 to 18 carbon atoms, an aryl group having 6 to 18 carbon atoms or an aralkyl group having 7 to 18 carbon atoms; M represents a hydrogen atom, an alkali metal, an alkaline earth metal or an onium group; and $Z^1$ represents a halide ion); and B represents a partial structure represented by formula (III):

wherein R', $R^2$, $L^1$, and Y are as defined above.

The hydrophilic polymer than can be used in the invention has a reactive group and a hydrophilic group. The hydrophilic polymer may have a reactive group at one terminal of the main chain or at least two reactive groups bonded to the main chain.

The term "reactive group" as used herein denotes a functional group reactive with a hydrolysis/polycondensation product of a metal alkoxide to form a chemical bond. A plurality of such reactive groups may react with each other to form a chemical bond. The hydrophilic polymer is preferably water soluble. It is preferred for the hydrophilic polymer to become water insoluble on reacting with a hydrolysis/polycondensation product of the metal alkoxide.

The term "chemical bond" is intended to include a covalent bond, an ionic bond, a coordination bond, and a hydrogen bond as is commonly used. The chemical bond is preferably a covalent bond.

The "reactive group" is generally the same as the one contained in a polymer crosslinking agent that forms a crosslinked structure on heat or light application. For the details of the crosslinking agent, reference can be made to S. Yamashita and T. Kaneko, *Kakyozai Handbook*, Taiseisya (1981).

Examples of the reactive group include a carboxyl group (HOOC—) or a salt thereof (MOOC—, M is a cation), a carboxylic acid anhydride group (a monovalent group derived from, e.g., succinic anhydride, phthalic anhydride or maleic anhydride), an amino group ($H_2N$—), a hydroxyl group (HO—), an epoxy group (e.g., glycidyl), a methylol group (HO—$CH_2$—), a mercapto group (HS—), an isocyanate group (OCN—), a blocked isocyanate group, an alkoxysilyl group, an alkoxy titanate group, an alkoxy aluminate group, an alkoxy zirconate group, an ethylenically unsaturated double bond, an ester bond, and a tetrazole group. An alkoxysilyl group is the most preferred reactive group. The hydrophilic polymer may have two or more reactive groups at one terminal thereof. When the hydrophilic polymer has two or more reactive groups per molecule, they may be the same or different.

The hydrophilic polymer preferably has a linking group between the repeating unit and the reactive group, on the repeating unit, or on the main chain. The linking groups A, $L^1$, $L^2$, and $L^3$ are each preferably selected from —O—, —S—, —CO—, —NH—, —N=, an aliphatic group, an aromatic group, a heterocyclic group, and a combination thereof. The linking groups are each still preferably selected from —O—, —S—, —CO—, —NH—, and a combination containing —O—, —S—, —CO— or —NH—.

The hydrophilic polymer of formula (I) having a reactive group at one terminal thereof (hereinafter simply referred to as the polymer (I)) is prepared by, for example, radically polymerizing a hydrophilic monomer (e.g., acrylamide, acrylic acid or potassium 3-sulfopropyl methacrylate) in the presence of a chain transfer agent (see K. Hasuike and T. Endo, *Radical Jyugo Handbook*, N.T.S., Inc.) or an iniferter (see T. Otsu, *Macromolecules*, vol. 19, p. 287 (1986)). Examples of the chain transfer agent are 3-mercaptopropionic acid, 2-aminoethanethiol hydrochloride, 3-mercaptopropanol, 2-hydroxyethyl disulfide, and 3-mercaptopropyltrimethoxysilane. A radical polymerization initiator having a reactive group (e.g., carboxyl) may be used in place of the chain transfer agent in the radical polymerization of a hydrophilic monomer (e.g., acrylamide).

The hydrophilic polymer with a reactive group at one terminal thereof preferably has a weight average molecular weight of not more than 1,000,000, more preferably 1,000 to 1,000,000, even more preferably 2,000 to 100,000.

The polymer (I) has a reactive group at one of its terminals. In formula (I), $R^1$ and $R^2$ each represent a hydrogen atom or a hydrocarbon group with 8 or fewer carbon atoms. Examples of the hydrocarbon group include an alkyl group and an aryl group. The hydrocarbon group is preferably a straight-chain, branched or cyclic alkyl group with 8 or fewer carbon atoms, such as methyl, ethyl, propyl, butyl, pentyl, hexyl, heptyl, octyl, isopropyl, isobutyl, sec-butyl, tert-butyl, isopentyl, neopentyl, 1-methylbutyl, isohexyl, 2-ethylhexyl, 2-methylhexyl or cyclopentyl. $R^1$ and $R^2$ are each preferably a hydrogen atom, a methyl group or an ethyl group in view of effects and availability.

The hydrocarbon group may have a substituent. A substituted alkyl group is a combination of an alkylene group and a substituent. The substituent is a monovalent nonmetal atom or atomic group except hydrogen. Preferred examples of the substituent include a halogen atom (e.g., —F, —Br, —Cl or —I), an alkoxy group, an aryloxy group, an alkylthio group, an arylthio group, an N-alkylamino group, an N,N-dialkylamino group, an acyloxy group, an N-alkylcarbamoyloxy group, an N-arylcarbamoyloxy group, an acylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N-alkyl-N-arylcarbamoyl group, a sulfo group, a sulfonate group, a sulfamoyl group, an N-alkylsulfamoyl group, an N,N-dialkylsulfamoyl group, an N-arylsulfamoyl group, an N-alkyl-N-arylsulfamoyl group, a phosphono group, a phosphonate group, a dialkylphosphono group, a diarylphosphono group, a monoalkylphosphono group, an alkylphosphonate group, a monoarylphosphono group, an arylphosphonate group, a phosphonoxy group, a phosphonatoxy group, an aryl group, and an alkenyl group.

The alkylene moiety of the substituted alkyl group is a divalent organic group derived by removing any one of the hydrogen atoms of the above-described alkyl group having 1 to 8 carbon atoms. The alkylene moiety preferably has a straight chain structure with 1 to 12 carbon atoms, a branched chain structure with 3 to 12 carbon atoms or a cyclic structure with 5 to 10 carbon atoms. Examples of suitable substituted alkyl group composed of a combination of the alkylene group and the substituent are chloromethyl, bromomethyl, 2-chloroethyl, trifluoromethyl, methoxymethyl, methoxyethoxyethyl, allyloxymethyl, phenoxymethyl, methylthiomethyl, tolylthiomethyl, ethylaminoethyl, diethylaminopropyl, morpholinopropyl, acetyloxymethyl, benzoyloxymethyl, N-cyclohexylcarbamoyloxyethyl, N-phenylcarbamoyloxyethyl, acetylaminoethyl, N-methylbenzoylaminopropyl, 2-hydroxyethyl, 2-hydroxypropyl, carboxypropyl, methoxycarbonylethyl, allyloxycarbonylbutyl, chlorophenoxycarbonylmethyl, carbamoylmethyl, N-methylcarbamoylethyl, N,N-dipropylcarbamoylmethyl, N-(methoxyphenyl)carbamoylethyl, N-methyl-N-(sulfophenyl)carbamoylmethyl, sulfobutyl, sulfonatobutyl, sulfamoylbutyl, N-ethylsulfamoylmethyl, N,N-dipropylsulfamoylpropyl, N-tolylsulfamoylpropyl, N-methyl-N-(phosphonophenyl)sulfamoyloctyl, phosphonobutyl, phosphonatohexyl, diethylphosphonobutyl, diphenylphosphonopropyl, methylphosphonobutyl, methylphosphonatobutyl, tolylphosphonohexyl, tolylphosphonatohexyl, phosphonoxypropyl, phosphonatoxybutyl, benzyl, phenethyl, α-methylbenzyl, 1-methyl-1-phenylethyl, p-methylbenzyl, cinnamyl, allyl, 1-propenylmethyl, 2-butenyl, 2-methylallyl, 2-methylpropenylmethyl, 2-propynyl, 2-butynyl, and 3-butynyl.

A and $L^1$ each represent a single bond or an organic linking group. The organic linking group as A or $L^1$ is a polyvalent nonmetal linking group, specifically, a linking group composed of 1 to 60 carbon atoms, 0 to 10 nitrogen atoms, 0 to 50 oxygen atoms, 1 to 100 hydrogen atoms, and 0 to 20 sulfur atoms. Even more specifically, examples of the linking group include the following constituent units and combinations thereof.

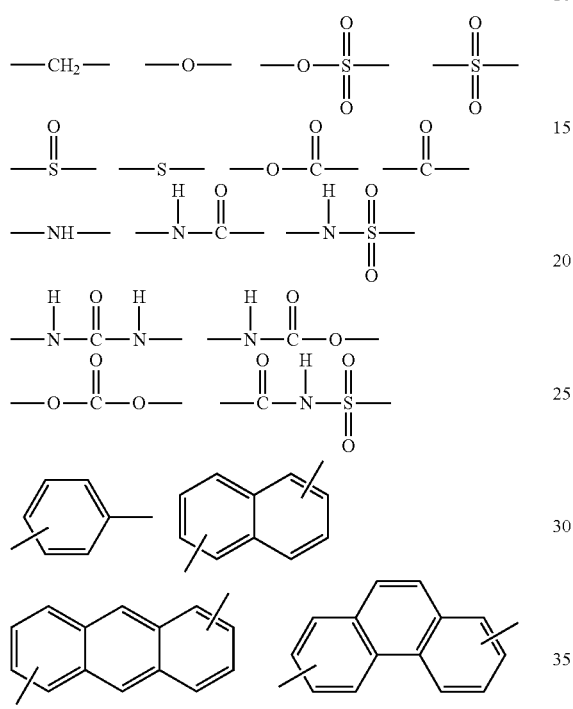

Y represents —$NHCOR^7$, —$CONH_2$, —$CON(R^7)_2$, —$COR^7$, —OH, —$CO_2M$, —$SO_3M$, —$PO_3M$, —$OPO_3M$ or —$N(R^7)_3Z^1$, wherein $R^7$ represents an alkyl, aryl or aralkyl group having 1 to 18 carbon atoms; M represents a hydrogen atom, an alkali metal, an alkaline earth metal or an onium group; and $Z^1$ represents a halide ion. A plurality of $R^7$s as in —$CON(R^7)_2$ or —$N(R^7)_3Z^1$ may be connected to each other to form a ring that may contain a hetero atom, e.g., oxygen, sulfur or nitrogen. $R^7$ may have a substituent. The substituent on $R^7$ can be selected from those recited as examples of the substituent of the substituted alkyl group as $R^1$ or $R^2$.

Examples of suitable groups as $R^7$ are methyl, ethyl, propyl, butyl, pentyl, hexyl, heptyl, octyl, isopropyl, isobutyl, sec-butyl, tert-butyl, isopentyl, neopentyl, 1-methylbutyl, isohexyl, 2-ethylhexyl, 2-methylhexyl, and cyclopentyl. Examples of M are hydrogen, lithium, sodium, potassium, calcium, barium, ammonium, iodonium, and sulfonium. Y is preferably —$NHCOCH_3$, —$CONH_2$, —COOH, —$SO_3^-NMe_4^+$, or morpholyl.

Specific but non-limiting examples of the hydrophilic polymer (I) that are preferably used as component (a) in the invention are shown below (compound Nos. 1 through 38).

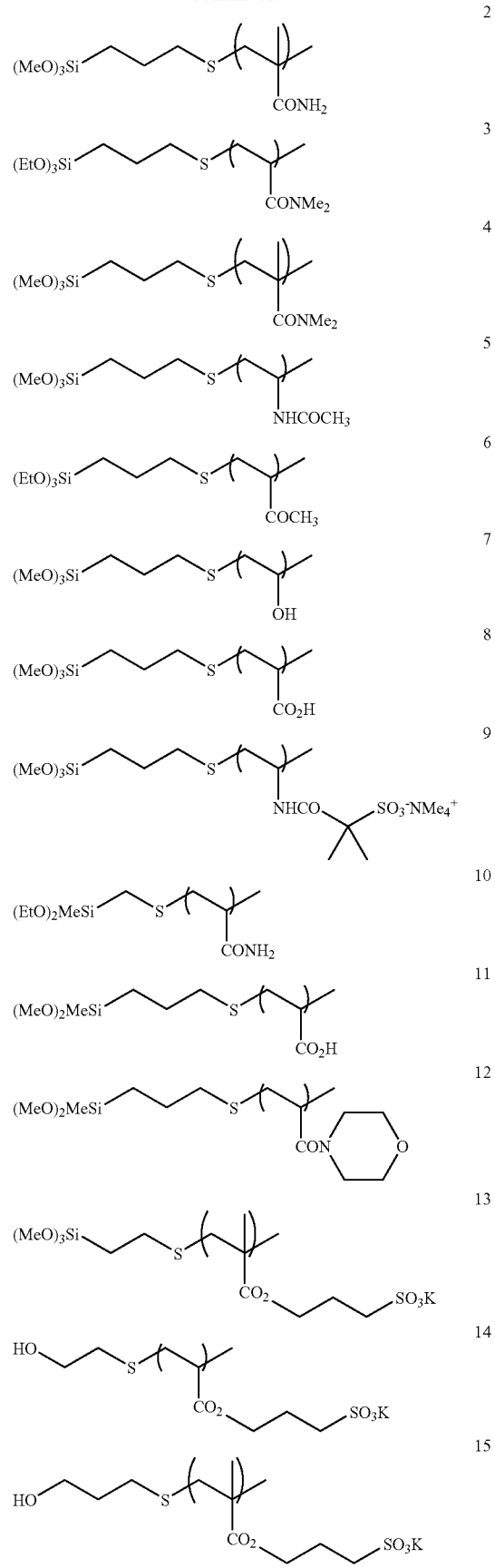

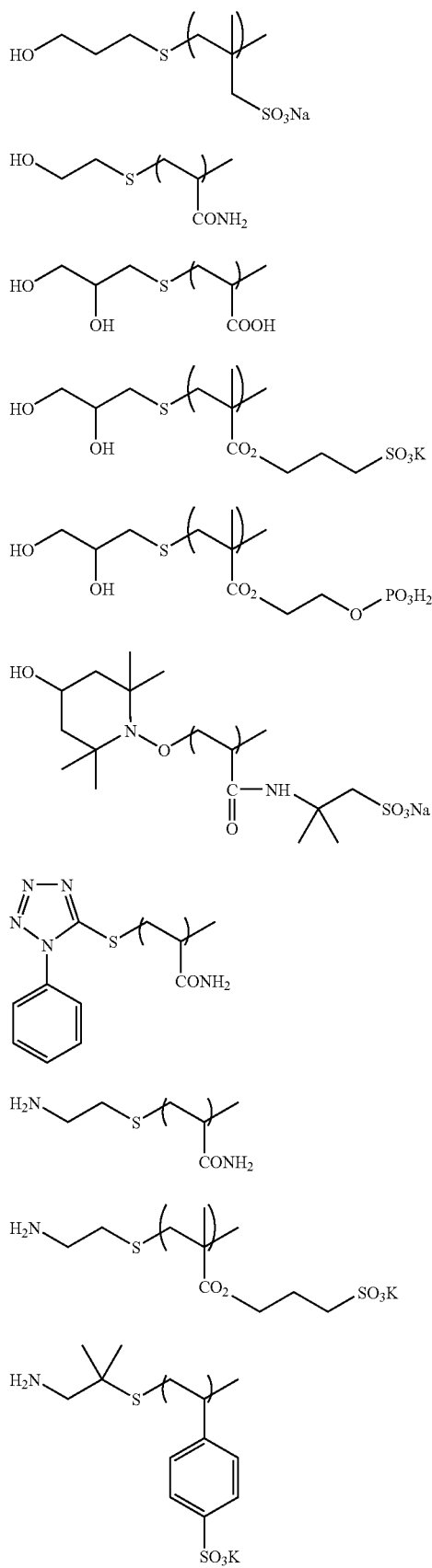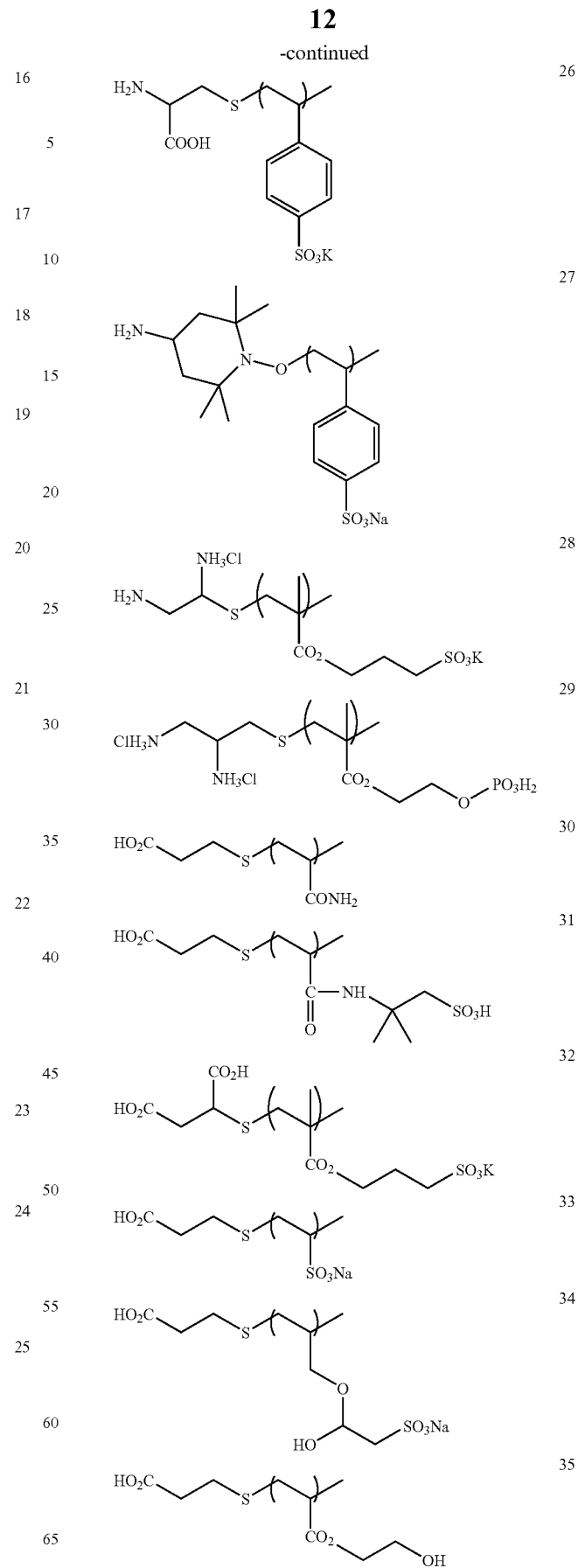

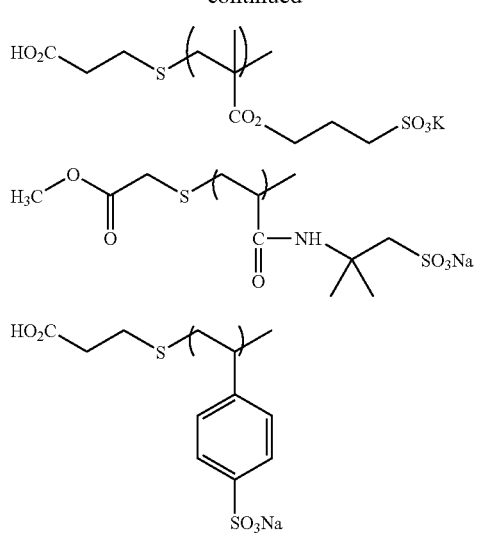

The above listed hydrophilic polymers (I) can be synthesized by radical polymerization of a radically polymerizable monomer represented by formula (i) below in the presence of a silane coupling agent represented by formula (ii) below that has chain transfer ability in radical polymerization. Since the silane coupling agent (ii) has chain transfer ability, the radical polymerization results in the formation of a polymer having a silane coupling group introduced into the terminal of the main chain thereof.

wherein A, $R^1$, $R^2$, $L^1$, X and Y are as defined above.

The monomer compound (I) and the silane coupling agent (ii) are commercially available and can easily be synthesized.

The hydrophilic polymer of formula (II) having at least two reactive groups can be a hydrophilic graft polymer comprising a trunk polymer having a functional group reactive with a metal alkoxide and a hydrophilic branch polymer grafted to the trunk polymer.

In formula (II), $R^3$, $R^4$, $R^5$, and $R^6$ each have the same meaning as $R^1$ and $R^2$ of formula (I); $L^2$ and $L^3$ each have the same meaning as $L^1$ of formula (I); B is a partial structure represented by formula (III), in which $R^1$, $R^2$, $L^1$, and Y are as defined above; and X is as defined above.

The hydrophilic graft polymer is prepared by any process commonly known for the synthesis of graft polymers. More information about general synthesis of graft polymers are described in F. Ide, *Graft Jyugo to sono Ohyo*, Kobunshikankokai (1977) and The Society of Polymer Science, Japan (ed.), Shin-kobunshi Jikkengaku 2, Kobunshino Gosei Han-no, Kyoritsu Shuppan (1995).

Methods of synthesizing graft polymers are divided basically into three: (1) method involving polymerizing a branch monomer on a trunk polymer, (2) method involving bonding a branch polymer to a trunk polymer, and (3) method involving copolymerizing a branch polymer with a trunk polymer (macromonomer or macromer method). Any of the three methods can be used to form the hydrophilic graft polymer to be used in the invention. The third method (macromonomer method) is particularly preferred from the viewpoint of production suitability and film structure controllability.

Synthesis of graft polymers using macromonomers is described in Shin-kobunshi Jikkengaku 2, Kobunshino Gosei Han-no, supra and T, Yamashita, et al., *Macromonomer no Kagaku to Kogyo*, IPC Science and Technology Press, 1989. Specifically, the hydrophilic graft polymer for use in the invention can be synthesized by copolymerizing a hydrophilic macromonomer (a precursor of a hydrophilic branch polymer) prepared by the process described in the literature with a monomer having a functional group reactive with a crosslinking agent.

Of hydrophilic macromonomers usable in the invention, particularly useful are those derived from carboxyl-containing monomers such as acrylic acid and methacrylic acid; sulfonic acid macromonomers derived from 2-acrylamido-2-methylpropanesulfonic acid, vinylstyrenesulfonic acid and their salts; amide macromonomers derived from acrylamide, methacrylamide, etc.; amide macromonomers derived from N-vinylcarboxylic acid amides, such as N-vinylacetamide and N-vinylformamide; macromonomers derived from hydroxyl-containing monomers, such as hydroxyethyl methacrylate, hydroxyethyl acrylate, and glycerol monomethacrylate; and macromonomers derived from alkoxy- or ethylene oxide-containing monomers, such as methoxyethyl acrylate, methoxypolyethylene glycol acrylate, and polyethylene glycol acrylate. Monomers having a polyethylene glycol chain or a polypropylene glycol chain are also useful macromonomers. The weight average molecular weight of these macromonomers is in the range of 400 to 100,000, preferably in the range of 1,000 to 50,000, and more preferably in the range of 1,500 to 20,000. With the molecular weight of 400 or more, effective hydrophilicity is secured. With the molecular weight of more than 100,000, the macromonomer tends to have insufficient copolymerizability with the monomer forming the trunk polymer.

The monomer copolymerizable with the hydrophilic macromonomer has a functional group reactive with a crosslinking agent (hereinafter "reactive group"). Examples of the reactive group include a carboxyl group or a salt thereof, an amino group, a hydroxyl group, a phenolic hydroxyl group, an epoxy group (e.g., a glycidyl group), a methylol group, an isocyanate group, a blocked isocyanate group, and a group derived from a silane coupling agent. Commonly employed monomers include those described in S. Yamashita and T. Kaneko, *Kakyozai Handbook*, Taiseisya (1981), K. Kato, *Shigaisen-koka System*, Sogo Gijutu Center (1989), K. Kato, *UV-EB Koka Handbook* (Genryo-hen), Kobunshikankokai (1985), and K. Akamatsu, *Shin Kankoseijyushi no Jissaigijutu*, CMC, pp. 102-145 (1987). Specific examples of such monomers include (meth)acrylic acid and its alkali or amine salts, itaconic acid and its alkali or amine salts, 2-hydroxyethyl(meth)acrylate, hydroxypropyl (meth)acrylate, phenolic hydroxyl-containing compounds such as a compound represented by formula (1) below, glycidyl methacrylate, allyl glycidyl ether, N-methylolmethacrylamide, 2-methacryloyloxyethyl isocyanate, blocked isocyanate compounds such as a compound represented by formula (2) below, a vinylalkoxysilane, and a γ-methacryloxypropyltrialkoxysilane.

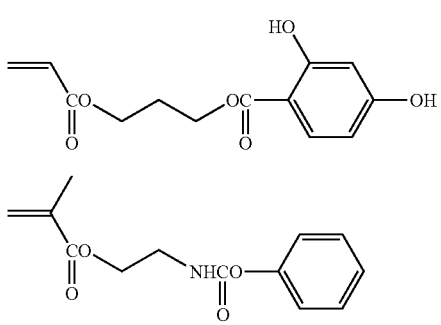

The graft polymer preferably has a weight average molecular weight of less than 1,000,000, more preferably more than 1,000, even more preferably from 20,000 to 100,000. With the molecular weight less than 1,000,000, the hydrophilic graft polymer is sufficiently soluble in a solvent to provide a coating composition with good handling properties, i.e., a sufficiently low viscosity to be applied to form a uniform coating film.

The hydrophilic polymers including the polymer (I) and the polymer (II) contain a hydrophilic functional group Y that develops hydrophilic properties. The higher the density of this functional group, the higher the surface hydrophilicity. The hydrophilic functional group density, being represented by the number of moles of the functional group per gram of the hydrophilic polymer, is preferably 1 to 30 meq/g, more preferably 2 to 20 meq/g, even more preferably 3 to 15 meq/g.

The copolymerization ratio of the hydrophilic polymer (II) is selected arbitrarily so that the density of the hydrophilic functional group Y may be in the above-recited range. Taking the mole numbers of the monomer unit containing B and the monomer unit containing X as m and n, respectively, the copolymerization ratio m/n is preferably 30/70 to 99/1, more preferably 40/60 to 98/2, even more preferably 50/50 to 97/3. As long as the ratio of m is 30 mol % or higher, hydrophilicity is sufficient. As long as the ratio of n is 1 mol % or higher, the amount of the reactive group is enough to show sufficient cure to provide a film with sufficient strength.

The hydrophilic polymer forms a crosslinked polymer film in a state mixed with a hydrolysis and polycondensation product of a metal alkoxide. The hydrophilic polymer as an organic component is responsible for development of film strength and flexibility as well as hydrophilicity. When the hydrophilic polymer has a viscosity of 0.1 to 100 cPs, preferably 0.5 to 70 cPs, more preferably 1 to 50 cPs, in a 5% aqueous solution at 25° C., it provides satisfactory film properties.

The metal alkoxide that can be used in the invention is a hydrolyzable and polymerizable compound having, in its structure, a functional group capable of hydrolysis and polycondensation to perform the function as a crosslinking agent. The metal alkoxide molecules per se are polycondensed with each other to form a tough film having a crosslinked structure while forming chemical bonds with the hydrophilic polymer. The metal alkoxide can be represented by formulae (IV-1) and (IV-2):

wherein $R^8$ represents a hydrogen atom, an alkyl group or an aryl group; $R^9$ represents an alkyl group or an aryl group; Z represents Si, Ti or Zr; and in represents an integer of 0 to 2.

In formulae (IV-1) and (IV-2), the alkyl group as represented by $R^8$ and $R^9$ preferably contains 1 to 4 carbon atoms. The alkyl or aryl group as $R^8$ and $R^9$ may have a substituent, such as a halogen atom, an amino group or a mercapto group. The metal alkoxide is a low molecular compound, preferably having a molecular weight less than 2000.

Specific but non-limiting examples of the hydrolyzable compounds represented by formulae (IV-1) and (TV-2) are shown below.

Examples of the hydrolyzable compound of formula (IV-1) in which Z is silicon include trimethoxysilane, tetramethoxysilane, tetraethoxysilane, tetrapropoxysilane, methyltrimethoxysilane, dimethyldimethoxysilane, γ-chloropropyltriethoxysilane, γ-mercaptopropyltrimethoxysilane, γ-aminopropyltriethoxysilane, phenyltrimethoxysilane, and diphenyldimethoxysilane. Preferred of them are trimethoxysilane, tetramethoxysilane, tetraethoxysilane, methyltrimethoxysilane, dimethyldimethoxysilane, and phenyltrimethoxysilane.

Examples of the hydrolyzable compound of formula (IV-1) in which Z is titanium include titanium trimethoxide, titanium tetramethoxide, titanium triethoxide, titanium tetraethoxide, titanium tetrapropoxide, titanium chlorotrimethoxide, titanium chlorotriethoxide, titanium ethyltrimethoxide, titaniummethyltriethoxide, titaniumethyltriethoxide, titanium diethyldiethoxide, titanium phenyltrimethoxide, and titanium phenyltriethoxide. Examples of the hydrolyzable compound of formula (IV-1) in which Z is zirconium include organozirconium compounds corresponding to the organotitanium compounds recited above.

Examples of the hydrolyzable compound of formula (IV-2), i.e., the aluminum-containing compound include aluminum trimethoxide, aluminum triethoxide, aluminum tripropoxide, and aluminum triisopropoxide.

The metal complex catalyst that can be used to form the hydrophilic layer of the invention promotes the hydrolysis and polycondensation of the metal alkoxide containing Si, Ti, Zr or Al and induces bonding of the hydrophilic polymer to the hydrolysis/polycondensation product. The metal complex catalyst is preferably one formed of a metal element selected from the groups 2A, 3B, 4A, and 5A of the Periodic Table and an oxo- or hydroxyl oxygen-containing compound selected from a β-diketone, a keto ester, a hydroxycarboxylic acid or an ester thereof, an amino alcohol, and an enol type active hydrogen compound.

Of the metal elements described preferred are Mg, Ca, St, and Ba as the group 2A elements, Al and Ga as the group 3B elements, Ti and Zr as the group 4A elements, and V, Nb and Ta as the group 5A elements, each of which forms a complex having an excellent catalytic effect. Particularly preferred complexes are Zr, Al or Ti complexes.

Examples of the oxo- or hydroxyl oxygen-containing compound forming the ligand of the metal complex catalyst include β-diketones such as acetylacetone (pentane-2,4-dione) and heptane-2,4-dione; ketoesters such as methyl acetoacetate, ethyl acetoacetate, and butyl acetoacetate; hydroxycarboxylic acids and esters thereof such as lactic acid, methyl lactate, salicylic acid, ethyl salicylate, phenyl salicylate, malic acid, tartaric acid, and methyl tartrate; keto alcohols such as 4-hydroxy-4-methyl-2-pentanone, 4-hydroxy-2-pentanone, 4-hydroxy-4-methyl-2-pentanone, and 4-hydroxy-2-heptanone; amino alcohols such as monoethanolamine, N,N-dimethylethanolamine, N-methylmonoethanolamine, diethanolamine, and triethanolamine; enol type active hydrogen compounds such as methylolmelamine, methylolurea, methylolacrylamide, and diethyl malonate; and compounds derived by bonding a substituent to the methyl, methylene or carbonyl carbon of acetylacetone (hereinafter referred to as acetylacetone derivatives).

Acetylacetone and the acetylacetone derivatives are preferred ligand compounds. Examples of the substituent on the methyl group of acetylacetone are an alkyl group, an acyl group, a hydroxyalkyl group, a carboxyalkyl group, an alkoxy group, and an alkoxyalkyl group each of which contains 1 to 3 carbon atoms and may be straight or branched. Examples of the substituent on the methylene group of acetylacetone include a carboxyl group and a carboxy- or hydroxyalkyl group which contains 1 to 3 carbon atoms and may be straight or branched. Examples of the substituent on the carbonyl carbon of acetylacetone include an alkyl group having 1 to 3 carbon atoms. When the carbonyl carbon is substituted, the carbonyl oxygen has a hydrogen atom added to become a hydroxyl group.

Examples of preferred acetylacetone derivatives include ethylcarbonylacetone, n-propylcarbonylacetone, isopropylcarbonylacetone, diacetylacetone, 1-acetyl-1-propionylacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxyethylcarbonylacetone, carboxypropylcarbonylacetone, and diacetone alcohol. Particularly preferred ligand compounds are acetylacetone and diacetylacetone. The complex between acetylacetone or a derivative thereof and the metal is a mononuclear complex having 1 to 4 molecules of acetylacetone or a derivative thereof coordinated per metal element. When the number of the coordination positions of the center metal is larger than the total number of bonds formed with an acetylacetone or acetylacetone derivative ligand, the rest of the positions may be occupied by a ligand widely used in general complexes such as an aquo ($H_2O$) ion, a halide ion, a nitro group or an ammonio group.

Examples of preferred metal complexes include tris(acetylacetonato)aluminum, bis(acetylacetonato)aquoaluminum, mono(acetylacetonato)aluminum chloro complexes, bis(diacetylacetonato)aluminum complexes, ethylacetoacetatoaluminum diisopropylate, tris(ethylacetoacetato)aluminum, cyclic aluminum oxide isopropylate, tris(acetylacetonato) barium, bis(acetylacetonato)titanium complexes, tris(acetylacetonato)titanium complexes, di(isopropoxy)bis(acetylacetonato)titanium, tris(ethylacetoacetato)zirconium complexes, and zirconium trisbenzoate complexes. They exhibit high stability in a waterborne coating system and an excellent gelation promoting effect in sol-gel reaction when heat dried. Particularly preferred of them are ethylacetoacetatoaluminum diisopropylate, tris(ethylacetoacetato)aluminum, bis(acetylacetonato)titanium complexes, and tris(ethylacetoacetato)zirconium complexes.

The counter ions in the examples of complex salts, while not described above, are arbitrary as long as the complex compounds are water soluble salts with charge neutrality. For example, salt forms securing stoichiometric neutrality, such as a nitrate, a halogen acid salt, a sulfate, and a phosphate, are used. Detailed information on the behavior of metal complexes in silica sol gel reaction is given in *J. Sol-Gel Sci. and Tec.*, vol. 16, p. 209 (1999). The reaction mechanism is assumed to be as follows. The metal complex in a coating composition takes on a coordination structure and is therefore stable. In dehydrating condensation reaction started in the step of heat drying following application of the coating composition, the complex is considered to act like an acid catalyst to promote crosslinking. Anyway, using the metal complex improves coating composition's stability with time and coating film properties as well as secures high hydrophilicity and durability of the resulting surface layer.

The metal complex catalyst may be used in combination with a catalyst capable of promoting the hydrolysis and polycondensation of the metal (Si, Ti, Zr or Al) alkoxide and inducing bonding of the hydrolysis/polycondensation product to the hydrophilic polymer. Examples of such a catalyst include acidic compounds such as hydrohalic acids (e.g., hydrochloric acid), nitric acid, sulfuric acid, sulfurous acid, hydrogen sulfide water, perchloric acid, hydrogen peroxide, carbonic acid, carboxylic acids (RCOOH) (e.g., formic acid and acetic acid), substituted carboxylic acids (with R substituted by other element or atomic group), sulfonic acids (e.g., benzenesulfonic acid); ammoniacal bases, e.g., aqueous ammonia; and basic compounds such as amines, e.g., ethylamine and aniline.

The metal complex catalysts described for use in the invention are easily commercially available and also obtainable through known synthesis processes such as the reaction between a metal chloride and an alcohol.

An antimicrobial agent can be incorporated into the hydrophilic coating composition to provide the hydrophilic member of the invention with antimicrobial, antifungal and anti-algae properties. The antimicrobial agent to be incorporated is preferably hydrophilic and water soluble. Incorporating a hydrophilic, water soluble antimicrobial agent into the coating composition provides a surface hydrophilic member with excellent antibacterial, antifungal and anti-algae properties without impairing the surface hydrophilicity.

The antimicrobial agent is preferably a compound that does not reduce the hydrophilicity of the hydrophilic member. Such antimicrobial agents include inorganic ones and water soluble organic ones. The antimicrobial agent to be used is selected from compounds with germicidal effects on microorganisms in the environment including bacteria typified by *Staphylococcus aureaus* and *Escherichia coli* and fungi typified by molds and yeasts.

Useful organic antimicrobial agents include phenol ether derivatives, imidazole derivatives, sulfone derivatives, N-haloalkylthio compounds, anilide derivatives, pyrrole derivatives, quaternary ammonium salts, pyridine compounds, triazine compounds, benzisothiazoline compounds, and isothiazoline compounds. Specific examples include, but are not limited to, 1,2-benzisothiazolin-3-one, N-fluorodichloromethylthiophthalimide, 2,3,5,6-tetrachloroisophthalonitrile, N-trichloromethylthio-4-cyclohexene-1,2-dicarboxyimide, (8-quinolinato) copper complexes, bis(tributyltin) oxide, 2-(4-thiazolyl)benzimidazole (hereinafter TBZ), methyl 2-benzimidazolecarbamate (hereinafter BCM), 10,10'-oxybisphenoxyarsine (hereinafter OBPA), 2,3,5,6-tetrachloro-4-(methylsulfone)pyridine, bis(2-pyridylthio-t-oxide)zinc (hereinafter ZPT), N,N-dimethyl-N'-(fluorodichloromethylthio)-N'-pheny lsulfamide(dichlorofluanide), poly(hexamethylenebiguanide)hydrochloride, dithio-2,2'-bis(benzmethylamide), 2-methyl-4,5-trimethylene-4-isothiazolin-3-one, 2-bromo-2-nitro-1,3-propanediol, hexahydro-1,3,5-tris(2-hydroxyethyl)-s-triazine, p-chloro-m-xylenol, and 1,2-benzisothiazolin-3-one.

A choice is made from these organic antimicrobials as appropriate taking hydrophilicity, water resistance, sublimability, stability, and the like into consideration. Of the organic antimicrobials preferred are 2-bromo-2-nitro-1,3-propanediol, TBZ, BCM, OBPA, and ZPT in view of their hydrophilicity, antimicrobial activity, and cost.

The inorganic antimicrobials include, in descending order of antimicrobial activity, mercury, silver, copper, zinc, iron, lead, and bismuth. The antimicrobial metal, such as silver, copper, zinc or nickel, is used in the form of metal or metal ion supported on a carrier, such as a silicate, a phosphate, an oxide, glass, potassium titanate or an amino acid. Examples of the inorganic antimicrobials further include, but are not limited to, zeolite-based antimicrobials, calcium silicate-based antimicrobials, zirconium phosphate-based antimicrobials, calcium phosphate-based antimicrobials, zinc oxide-based antimicrobials, soluble glass-containing antimicrobials, silica gel-based antimicrobials, activated carbon-based antimicrobials, titanium oxide (titania)-based antimicrobials, organometallic antimicrobials, ion exchanging ceramic antimicrobials, layered phosphate-quaternary ammonium salt type antimicrobials, and antimicrobial stainless steel.

Additionally, naturally occurring antimicrobials are also useful, including chitosan that is a basic polysaccharide obtained by hydrolysis of chitin contained in the exoskeleton of crustaceans (crabs, shrimp, etc.).

Holon Killer Beads Ceiler (trade name, produced by Nikko Co.), which is an aminometal having a metal bonded to both sides of an amino acid, is preferred as an antimicrobial agent for use in the invention.

The above-described antimicrobial agents are nonvolatile, adapted to interact with the hydrophilic polymer or the crosslinking component of the hydrophilic layer, and stably soluble (molecularly dispersible) or dispersible in a liquid medium. When the hydrophilic coating composition containing the antimicrobial agent is applied to a substrate, the antimicrobial agent tends to be effectively exposed on the surface of the resulting hydrophilic layer and yet is not dissolved when wetted with water and holds its antimicrobial effect for a prolonged period of time with no harm to human health. The antimicrobial agent is stably dispersible in the coating composition and eventually in the resultant hydrophilic layer. That is, neither the coating composition nor the hydrophilic layer suffers from deterioration.

Of the recited antimicrobial agents preferred are silver-based inorganic antimicrobials and water-soluble organic antimicrobials for their high antimicrobial activities. More preferred are silver-on-zeolite (silver supported on a silicate carrier), silver-on-silica gel, 2-bromo-2-nitro-1,3-propanediol, TPN, TBZ, BCM, OBPA, and ZPT. Particularly preferred commercially available silver-on-zeolite antimicrobials are Zeomic from Shinagawa Fuel Co., Silwell from Fuji Silysia Chemical Ltd., and Bactenon from Japan Electronic Materials Corp. Novaron (silver on inorganic ion exchanger ceramic) from Toa Gosei Co., Ltd., Atomy Ball from Catalysts & Chemicals Industries Co., Ltd., and San-ai Bac P (triazine antimicrobial) from San-ai Oil Co., Ltd. are also preferred.

The antimicrobial agent is usually added in an amount of 0.001% to 10% by weight, preferably 0.005% to 5% by weight, more preferably 0.01% to 3% by weight, even more preferably 0.02% to 1.5% by weight, and most preferably 0.05% to 1% by weight. With an antimicrobial agent content of 0.001% or more, effective antimicrobial action can be exhibited. With an antimicrobial agent content of not more than 10%, neither hydrophilic properties nor stability with time is impaired, and no adverse influences is exerted on anti stain/fog properties.

The hydrophilic layer of the invention can contain inorganic fine particles for improving hydrophilicity, protecting the coating film against cracking, and improving film strength. Examples of suitable inorganic particles include particles of silica, alumina, magnesium oxide, titanium oxide, magnesium carbonate or calcium alginate, and mixtures thereof.

The inorganic particles preferably have an average particle size of 5 nm to 10 µm, more preferably 0.5 to 3 µm. With the average particle size falling within that range, the particles are stably dispersed in the hydrophilic layer to make the layer strong enough to provide a hydrophilic member with high durability as well as surface hydrophilicity.

A colloidal silica dispersion is particularly preferred as inorganic particles. It is easily available on the market.

The amount of the inorganic particles to be added is preferably 80% by weight or less, more preferably 50% by weight or less, based on the total solids content of the hydrophilic layer.

In addition to the aforementioned components, the following additives may be incorporated into the coating composition for forming the hydrophilic layer.

(1) Surface Active Agent

Surface active agents that can be used in the invention include those described in JP-A 62-173463 and JP-A62-183457. Exemplary examples are anionic surface active agents such as dialkylsulfosuccinates, alkylnaphthalene-sulfonates, and fatty acid salts; nonionic ones such as polyoxyethylene alkyl ethers, polyoxyethylene alkyl allyl ethers, acetylene glycols, and polyoxyethylene polyoxypropylene block copolymers; and cationic ones such as alkylamine salts and quaternary ammonium salts. Organofluoro compounds may be used in place of these surface active agents. The organofluoro compounds are preferably hydrophobic. The organofluoro compounds include fluorine-containing surface active agents, oily fluoro compounds (e.g., fluorinated oil), and solid fluororesins (e.g., tetrafluoroethylene resin). Specific examples are described in JP-B 57-9053, cols. 8-17 and JP-A 62-135826.

(2) UV Absorbers

UV absorbers can be used to improve weatherability and durability of the hydrophilic member. Useful UV absorbers include benzotriazole compounds, such as those described in JP-A 58-185677, JP-A 61-190537, JP-A 2-782, JP-A 5-197075, and JP-A 9-34057; benzophenone compounds such as those described in JP-A 46-2784, JP-A 5-194483, and U.S. Pat. No. 3,214,463; cinnamic acid compounds such as those described in JP-B 48-30492, JP-B 56-21141, and JP-A 10-88106; triazine compounds such as those described in JP-A 4-299503, JP-A 8-53427, JP-A 8-239368, JP-A 10-182621, and JP-T 8-501291; the compounds disclosed in *Research Disclosure* No. 24239; and compounds that absorb ultraviolet light to emit fluorescence, namely fluorescent whitening agents, typified by stilbene compounds and benzoxazole compounds.

The amount of the UV absorber to be added is decided as appropriate to the intended use of the hydrophilic member. In general, it is preferably in the range of from 0.5% to 15% by weight on a solid basis.

(3) Antioxidant

Antioxidants can be added to the coating composition to improve the stability of the hydrophilic member. Suitable antioxidants include those described in European Patents 223739A, 309401A, 309402A, 310551A, 310552A, and 459416A, German Patent DE 3435443, JP-A 54-262047, JP-A 63-113536, JP-A-63 163351, JP-A 2-262654, JP-A 2-71262, JP-A 3-121449, JP-A 5-61166, JP-A 5-119449, and U.S. Pat. Nos. 4,814,262 and 4,980,275.

The amount of the antioxidant to be added is decided as appropriate for the intended use. It is preferably in the range of from 0.1% to 8% by weight on a solid basis.

(4) Solvent

In order for the coating composition to secure capability of forming a uniform coating film on a substrate, it is effective to add an organic solvent to the composition as appropriate. Suitable solvents include ketones, e.g., acetone, methyl ethyl ketone, and diethyl ketone; alcohols, e.g., methanol, ethanol, 2-propanol, 1-propanol, 1-butanol, and tert-butanol; chlorine-containing solvents, e.g., chloroform and methylene chloride; aromatic hydrocarbons, e.g., benzene and toluene; esters, e.g., ethyl acetate, butyl acetate, and isopropyl acetate; ethers, e.g., diethyl ether, tetrahydrofuran, and dioxane; and glycol ethers, e.g., ethylene glycol monomethyl ether and ethylene glycol dimethyl ether.

The effective amount of the organic solvent to be used is such that gives rise to no problem associated with VOC (volatile organic compound). Such an effective amount is preferably 0 to 50% by weight, more preferably 0 to 30% by weight, based on the total coating composition ready to be applied.

(5) Polymer

For the purpose of controlling the film properties of the hydrophilic layer, various polymers may be added to the coating composition within a range that does not affect the hydrophilic properties of the layer. Useful polymers include acrylic polymers, polyvinyl alcohol resins, polyvinyl butyral resins, polyurethane resins, polyamide resins, polyester resins, epoxy resins, phenol resins, polycarbonate resins, polyvinyl formal resins, shellac, vinyl resins, acrylic resins, rubber resins, waxes, and other natural resins. These polymers may be used either individually or as a combination thereof. Vinyl copolymers obtained by copolymerization of an acrylic monomer are preferred of them. Copolymers having a repeating unit derived from a carboxyl-containing monomer, an alkyl methacrylate or an alkyl acrylate are also preferred as a binder polymer.

Other additives may be used where necessary. For example, the coating composition may contain a leveling additive, a matting agent, a wax for controlling film properties, and a tackifier for improving adhesion to a substrate within ranges that do not impair hydrophilicity.

Examples of useful tackifiers include the high-molecular adhesive polymers described in JP-A 2001-49200, pp. 5-6, such as (meth) acrylic esters with alcohols having a C1 to C20 alkyl group, (meth)acrylic esters with C3 to C14 alicyclic alcohols, (meth)acrylic acid copolymers with C6 to C14 aromatic alcohols; and low-molecular adhesive resins containing a polymerizable unsaturated bond.

The substrate that can be used in the invention is not particularly limited. Examples of suitable substrates are glass, plastics, metals, ceramics, wood, stone, cement, concrete, fiber, fabric, paper, leather, combinations thereof, and laminates thereof. Glass substrates and plastic substrates are particularly suited.

Any of soda glass, lead glass, borosilicate glass, etc. can be used as a substrate. According to the purpose, float glass, figured glass, frosted glass, wired glass (glass with a wire mesh or parallel wires embedded therein), tempered glass, laminated glass, a double-glazed unit, vacuum glazed glass, burglar resistant glass, and a highly insulating low-E double glazed unit are also useful. While the hydrophilic layer may be formed directly on raw glass, one or both sides of raw glass may be hydrophilized by oxidation or surface roughening so as to have improved adhesion to the hydrophilic layer. Hydrophilization by oxidation can be effected by corona discharge treatment, glow discharge treatment, wet process chromating, flame treatment, hot air treatment, ozone/UV irradiation, or like surface treatment. Hydrophilization by surface roughening can be effected by mechanical treatment such as sand blasting or brush polishing.

The plastic substrates that can be used in the invention are not particularly limited. Examples of the plastic substrates include films and sheets of polyester, polyethylene, polypropylene, cellophane, cellulose triacetate, cellulose diacetate, cellulose acetate butyrate, polyvinyl chloride, polyvinylidene chloride, polyvinyl alcohol, ethylene vinyl alcohol, polystyrene, polycarbonate, polymethylpentene, polysulfone, polyether ketone, acrylic resins, nylon, fluoropolymers, polyimide, polyether-imide, and polyether sulfone. Films of polyesters, such as polyethylene terephthalate and polyethylene naphthalate, are particularly preferred. Transparent substrates are preferably used in optical applications. In some applications, translucent or printed substrates can be used. The thickness of the plastic substrate varies depending on another substrate on which the hydrophilic member is to be superposed. For use on a substrate with a curved surface, thin plastic films of about 6 to 50 µm in thickness are preferred. For use on a flat substrate or for applications where strength is demanded, plastic films with a thickness of 50 to 400 µm are used.

For the purpose of improving the adhesion of the substrate to the hydrophilic layer, one or both sides of the plastic substrate may be hydrophilized by oxidation or surface roughening. Hydrophilization by oxidation can be effected by corona discharge treatment, glow discharge treatment, wet process chromating, flame treatment, hot air treatment, ozone/UV irradiation, or like surface treatment. Hydrophilization by surface roughening can be effected by mechanical treatment such as sand blasting or brush polishing.

If desired, one or more primer layers may be applied to the substrate. Hydrophilic resins and water dispersible latices can be used to form a primer layer.

Examples of the hydrophilic resins include polyvinyl alcohol (PVA), cellulosic resins such as methyl cellulose (MC), hydroxyethyl cellulose (HEC), and carboxymethyl cellulose (CMC), chitins, chitosans, starch, resins having an ether linkage such as polyethylene oxide (PEO), polyethylene glycol (PEG), and polyvinyl ether (PVE), and carbamoyl-containing resins, such as polyacrylamide (PAAM) and polyvinyl pyrrolidone (PVP). Additionally, carboxyl-containing polymers, such as polyacrylates, maleic acid resins, and alginates, and gelatins are also usable.

Among them, preferred are one or more of polyvinyl alcohol resins, cellulosic resins, resins with an ether linkage, carbamoyl-containing resins, carboxyl-containing resins, and gelatins. Polyvinyl alcohol resins and gelatins are particularly preferred.

Examples of the water dispersible latices include acrylic latices, polyester latices, NBR resins, polyurethane latices, polyvinyl acetate latices, SBR resins, and polyamide latices. Acrylic latices are particularly preferred.

The above-described hydrophilic resins or water dispersible latices can be used individually, as a combination of the hydrophilic resins, as a combination of the water dispersible latices, or as a combination of the hydrophilic resin and the water dispersible latex.

Where necessary, the hydrophilic resin or water dispersible latex may be used in combination with a crosslinking agent therefor. Generally useful thermal crosslinking agents are described in *Kakyozai Handbook*, supra. The crosslinking agent to be used in the invention is not particularly limited as long as it contains at least two functional groups and is capable of effectively crosslinking the hydrophilic resin or water dispersible latex used. Specific examples of suitable thermal crosslinking agents are polycarboxylic acids, e.g., polyacrylic acid; amine compounds, e.g., polyethyleneimine; polyepoxy compounds, e.g., ethylene (or propylene) glycol diglycidyl ether, tetraethylene glycol diglycidyl ether, nonaethylene glycol diglycidyl ether, polyethylene (or polypropylene) glycol glycidyl ether, neopentyl glycol diglycidyl ether, 1,6-hexanediol diglycidyl ether, trimethylolpropane triglycidyl ether, and sorbitol polyglycidyl ether; polyaldehyde compounds, e.g., glyoxal and terephthalaldehyde; polyisocyanate compounds, e.g., tolylenediisocyanate, hexamethylene diisocyanate, diphenylmethane isocyanate, xylylene diisocyanate, polymethylenepolyphenyl isocyanate, cyclohexyl diisocyanate, cyclohexanephenylene diisocyanate, naphthalene 1,5-diisocyanate, isopropylbenzene 2,4-diisocyanate, and a polypropylene glycol/tolylene diisocyanate adduct; blocked polyisocyanate compounds; silane coupling agents, e.g., tetraalkoxysilanes; metallic crosslinking agents, e.g., acetylacetonato complexes of aluminum, copper or iron (III); and polymethylol compounds, e.g., trimethylolmelamine and pentaerythritol. Of these thermal crosslinking agents, water soluble ones are preferred in view of ease of preparing a coating composition and also for avoiding reduction of hydrophilicity of the resulting hydrophilic layer.

The hydrophilic resin and/or water dispersible latex can be used in a primer layer in a total amount preferably of from 0.01 to 20 g/m$^2$, more preferably of from 0.1 to 10 g/m$^2$.

The hydrophilic member according to the present invention can be used in expectation of developing anti-stain properties and/or anti-fog properties. In such applications, an additional layer or layers, such as an adhesive layer, a release layer, and a protective layer, may be provided on the hydrophilic member according to the end use, form, and place of use.

An adhesive layer is provided when the hydrophilic member is used as stuck to another substrate. In this case, it is preferred to apply a pressure sensitive adhesive to the back side of the substrate of the hydrophilic member. Useful pressure sensitive adhesives include those commonly used in pressure sensitive adhesive sheets, such as rubber adhesives, acrylic adhesives, silicone adhesives, vinyl ether adhesives, and styrene adhesives.

Where optical transparency is demanded, the pressure sensitive adhesive should be chosen from those for optical applications. Where a color, translucence or a texture (e.g., matte finish) is desired, such can be achieved by not only texturing the substrate per se but also adding a dye or organic or inorganic powder to the pressure sensitive adhesive layer.

In the case where a tackifier is needed, one or more of rosin resins, terpene resins, petroleum resins, styrene resins, and hydrogenation products of these resins can be used.

The adhesive force of the pressure sensitive adhesives usable in the invention is what is generally called "strong adhesion", i.e., 200 g/25 mm or more, preferably 300 g/25 mm or more, more preferably 400 g/25 mm or more. The term "adhesive force" as used herein means a value measured in a 180° peel test in accordance with JIS Z0237.

In the case where the hydrophilic member has the above-described adhesive layer, a release layer may be provided on the adhesive layer. The release layer preferably contains a release agent. Examples of releasing agents that can be usually used in the invention include silicones (organopolysiloxanes) fluorine compounds, long chain alkyl-modified polyvinyl alcohols, and long chain alkyl-modified polyethyleneimines. Also useful are hot melt type release agents, monomer type release agents containing a monomer that cures through radical polymerization, cationic polymerization, polycondensation, etc., copolymer resins (e.g., acrylic silicone copolymers, acrylic fluorine copolymers, and urethane silicone fluorine copolymers), silicone resin/acrylic resin polyblends, and fluororesin/acrylic resin polyblends. The release layer may be a hard coat release layer formed by curing a curing composition containing a fluorine atom and/or a silicon atom and a compound having an active energy ray-polymerizable group.

If desired, a protective layer may be provided on the hydrophilic layer. A protective layer functions to protect the hydrophilic layer from being scratched or reducing the hydrophilicity due to adhesion of dust and dirt during handling, transportation or storage. The protective layer can be formed of a hydrophilic polymer selected from those useful to form the release layer or primer layer. The protective layer is stripped off after the hydrophilic member is stuck to another substrate.

The hydrophilic member of the invention can be supplied in the form of sheet or ribbon of continuous form taken up into roll or in the form of cut sheet as a blank or a sheet cut to size.

The degree of hydrophilicity of a hydrophilic layer is commonly expressed in terms of water drop contact angle. However, in the cases where a surface has very high hydrophilicity as in the present invention, the water drop contact angle can be 10° or smaller and, in some cases, 5° or even smaller. This means that the method of comparing hydrophilicity by water drop contact angle measurement has a limit. Measurement of surface free energy furnishes a method of more precisely evaluating hydrophilicity of the surface of a solid. In the present invention, the Zisman method, one of various methods of surface free energy measurement so far proposed, is adapted. More specifically, an inorganic electrolyte (e.g., magnesium chloride) aqueous solution is used as a wetting liquid having an increasing surface tension with an increase in concentration. The surface tension of the liquid with a varied concentration measured in air at room temperature is plotted as the abscissa, and the cosine of the measured contact angle cos θ as the ordinate. The resulting plot is a straight line (Zisman plot). The value where the cosine of the contact angle is unity (i.e., contact angle=0°) is taken as a surface free energy of the solid. The surface tension of water is 72 mN/m. The larger the surface free energy, the higher the hydrophilicity.

A hydrophilic layer having a surface free energy ranging from 70 to 95 mN/m, preferably 72 to 93 mN/m, more preferably 75 to 90 mN/m, as measured by the above-described method can be said to have high hydrophilicity and exhibit excellent performance.

Transparency is of importance for the hydrophilic member of the invention when used as, or applied to, a transparent structure, such as a pane of glass, to secure visibility through the structure. The hydrophilic layer of the hydrophilic member can be designed to have excellent transparency, not to loose transparency even with an increased thickness, and yet to retain durability. The thickness of the hydrophilic layer is preferably 0.01 to 100 μm, more preferably 0.05 to 50 μm, even more preferably 0.1 to 20 μm. Thicknesses of 0.01 μm or larger assure sufficient durability as well as hydrophilicity. Thicknesses of 100 μm or smaller give rise to no film forming problems, such as cracking.

The transparency can be evaluated by measuring transmittance in a visible region (400 to 800 nm) with a spectrophotometer. The transmittance of the hydrophilic layer is preferably 70% to 100%, more preferably 75% to 95%, even more preferably 80% to 95%. The hydrophilic member having the hydrophilic layer the transmittance of which falls within that range is applicable to a broad range of applications without obstructing a clear view through it.

The hydrophilic member of the invention is obtained by applying the coating composition for forming a hydrophilic layer to an appropriate substrate and heat drying the wet coating film to form a surface hydrophilic layer. The temperature and time of heating are not particularly limited as long as the solvent in the coating composition (sol) is removed to form a firm coat. In view of production suitability, nevertheless, the heating is preferably carried out at 150° C. or lower for 1 hour or shorter.

The method of applying the coating composition is not restricted, and any known coating technique is employable, including spray coating, dip coating, flow coating, spin coating, roll coating, film applicator method, screen printing, bar coating, and application with a brush or sponge.

Substrates or structures to which the hydrophilic member of the invention is applicable in expectation of its anti-fogging effect are transparent ones, including transparent glass or plastic substrates, lenses, prisms, and mirrors.

Any of soda glass, lead glass, borosilicate glass, etc. can be used as a glass substrate. According to the purpose, float glass, figured glass, frosted glass, wired glass, tempered glass, laminated glass, a double-glazed unit, vacuum glazed glass, burglar resistant glass, and a highly insulating low-E double glazed unit are useful.

Applications in which the surface-hydrophilic member having anti fog properties is suitably used include mirrors such as automotive rearview mirrors, bathroom mirrors, quarter-bath mirrors, dentist's mirrors, and road mirrors; lenses such as spectacles lenses, optical lenses, camera lenses, endoscope lenses, lighting lenses, semiconductor lenses, and copier lenses; prisms; window glass for buildings and lookout towers and other architectural glass units; window glass for various vehicles including cars, railcars, airplanes, boats, ships, submersible vessels, snowcats, ropeway gondolas, and Ferris wheel gondolas; windshields for various vehicles including cars, railcars, airplanes, boats, ships, submersible vessels, snowcats, snowmobiles, motorcycles, ropeway gondolas, and Ferris wheel gondolas; protective goggles, sport goggles, visors of protective masks, visors of sportmasks, visors of protective helmets; cabinet glass for retail display of frozen foods; glass covers for display or operation panels of various instruments; and films applied to the surface of the articles recited above. The anti-fog, hydrophilic member of the invention is particularly suited for application to automotive glass and architectural glass.

Substrates or structures to which the hydrophilic member of the invention is applicable in expectation of its anti stain effect include not only glass and plastics but metals, ceramics, wood, stone, cement, concrete, fiber, fabric, paper, and combinations or laminates of the materials recited.

Applications in which the surface-hydrophilic member having anti stain properties is suited include architectural materials such as exterior materials (e.g., exterior walls, roofs, verandas, gutters), interior materials, sash frames, sash rails, panes, shutters, screen windows and doors, wall or glass sealants, and structural materials; exteriors and coatings of vehicles such as automobiles, railcars, airplanes, boats, ships, bicycles, and motorcycles; exteriors of machinery and articles; dustproof covers or coatings; exteriors or coatings of traffic signs, advertising signs, various display devices, advertising pillars and boards, roadway or railway noise barriers, bridges, and guardrails; pavements; interior and lighting of tunnels; insulators; solar cell covers; heat collecting covers of solar water heaters; plastic hothouses; green houses; vehicle covers; vehicle light protective covers; tents; reflectors; street lights, outdoor lights; stone materials or tiles for artificial waterfalls and fountains; vending machines; outdoor units of air conditioners; outdoor benches; toll booths; fare boxes; radiating fins of heat exchangers; housing equipment such as lavatory pans, bath tubs, washstand tops, mirrors of bathrooms or quarter bathrooms, lighting fixtures, lighting covers, kitchen utensils, tableware, dishwashers, dish dryers, sinks, stoves, range hoods, and ventilation fans; and films, patches, emblems, etc. to be stuck to the surface of the above-recited articles.

The hydrophilic member also finds applications to roofing materials, antennas, power lines, etc. for use in snowy regions, in which applications the hydrophilic member will exhibit excellent snow accretion resistance.

EXAMPLES

The present invention will now be illustrated in greater detail with reference to Examples, but it should be understood that the invention is not construed as being limited thereto. Unless otherwise noted, all the percents and parts are by weight.

Example 1

A 2 mm thick plate of float glass, the most common transparent sheet glass, was subjected to glow discharge treatment to have a hydrophilized surface. A coating composition described below was applied to the hydrophilized surface by means of a bar coater and dried in an oven at 100° C. for 10 minutes to form a hydrophilic layer having a thickness of 1.0 g/m². The resulting hydrophilic member (i.e., glass with the hydrophilic layer) had a surface free energy of 87 mN/m, proving to have a very highly hydrophilic surface. The hydrophilic layer had a visible light transmittance of 95% as measured with a spectrophotometer U3000 from Hitachi, Ltd.

Formulation of Coating Composition:

| | |
|---|---:|
| Colloidal silica 20% dispersion (Snowtex C from Nissan Chemical Industries, Ltd.) | 100 g |
| Sol-gel liquid prepared as follows | 500 g |
| 5% Aqueous solution of anionic surface active agent of formula: | 30 g |
| 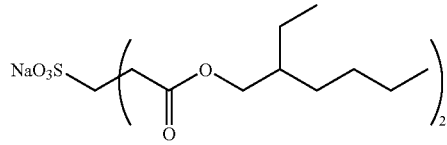 | |
| Purified water | 450 g |

Preparation of Sol Gel Liquid:

Eight grams of tetramethoxysilane (available from Tokyo Kasei Kogyo Co., Ltd.) and 5 g of a hydrophilic polymer having a silane coupling group at its terminal (hereinafter "hydrophilic polymer A") that was synthesized as described below were added to a mixture of 200 g of ethyl alcohol, 10 g of acetylacetone, 10 g of tetraethyl orthotitanate, and 100 g of purified water, followed by stirring at room temperature for 2 hours.

Synthesis of Hydrophilic Polymer A:

In a three necked flask were put 25 g of acrylamide, 3.5 g of 3-mercaptopropyltrimethoxysilane, and 51.3 g of dimethylformamide, and the mixture was heated up to 65° C. in a nitrogen stream. To the mixture was added 0.25 g of 2,2'-azobis(2,4-dimethylvaleronitrile) to initiate reaction. After 6 hour stirring, the reaction system was allowed to cool to room temperature and poured into 1.5 liters of ethyl acetate, whereupon a solid precipitated. The solid was collected by filtration, thoroughly washed with ethyl acetate, and dried. The resulting product, weighing 21 g, was confirmed to be polymer A having a polystyrene equivalent weight average molecular weight of 4,000. The polymer A had a viscosity of 2.5 cPs in a 5% aqueous solution and a hydrophilic functional group density of 13.4 meq/g.

The resulting hydrophilic member was evaluated as follows.

(1) Hydrophilicity

A water drop contact angle was measured in air with an automatic solid/liquid interface analyzing system (Dropmaster 500 from Kyowa Interface Science Co. Ltd.).

(2) Water Resistance

The hydrophilic side of the hydrophilic member (120 cm$^2$) was given 10 to-and-fro rubbings with sponge under a load of 1 kg in water. A film retention (%) was calculated from the change of weight due to the rubbing.

(3) Durability (Against Abrasion)

The hydrophilic side of the hydrophilic member was given 100 to-and-fro rubbings with nonwoven fabric (BEMCOT from Asahi Kasei Fibers) under a load of 500 g. The water drop contact angle of that side was measured before and after the abrasion test. A sample with satisfactory durability has a small contact angle even after being rubbed.

(4) Scratch Resistance

A scratch test was carried out using a scratch tester Type 18S from Shinto Scientific Co., Ltd. as follows. A stylus tipped with a sapphire sphere of 0.1 mm in diameter was moved over the hydrophilic side of the hydrophilic member under a load starting from 5 g and increasing by 5 g. The scratch resistance was expressed in gram of the load under which a visible scratch was produced. The higher the load, the higher the durability.

(5) Storage Stability (Non-Blocking Properties)

Fifty 5 cm square hydrophilic members were stacked. The stack was clamped in a vice with an applied torque of 300 kg and left to stand in that state at 45° C. and 75% RH for one day. After one day standing, blocking in the stack was examined.

(6) Anti Fog Properties

The hydrophilic member was put over a plastic cup containing 80° C. hot water, and the degree of fogging was observed with the naked eye.

(7) Anti Stain Properties

A slurry of 5 g of carbon black (FW-200 from Degussa) in 95 g of water was evenly sprayed onto the hydrophilic layer of the hydrophilic member and dried at 60° C. for 1 hour. The thus stained hydrophilic member was wiped with gauze in running water, dried, and inspected for any residual carbon black by measuring transmittance with a spectrophotometer (U3000 from Hitachi, Ltd.). The transmittance was calculated in accordance with JIS R3106.

(8) Visible Light Transmittance

The transmittance of the hydrophilic member was measured with a spectrophotometer (U3000 from Hitachi, Ltd.) in a wavelength region of 380 to 780 nm. The transmittance was calculated in accordance with JIS R3106.

(9) Chemical Resistance

The hydrophilic member was immersed in a 10% citric acid aqueous solution, a 10% sodium hydrogencarbonate aqueous solution or a 40% ethanol aqueous solution each for 1 hour. After the immersion, the damage of the hydrophilic layer was examined.

(10) Weatherability

The hydrophilic member was exposed to accelerated weathering in a sunshine carbon arc accelerated weathering tester for 500 hours. After the test, the sample was evaluated for hydrophilicity, water resistance, durability, anti fog properties, anti stain properties, and visible light transmittance in accordance with the methods described.

(11) Stability with Time of Coating Composition

The coating composition for the formation of a hydrophilic layer was stored in a refrigerator at 5° C.±2° C. The number of days required for the liquid to turn into gel was measured. The greater the number of days, the higher the stability with time.

The results of the evaluation were as follows. The hydrophilic member had a water drop contact angle of 5° or smaller, proving highly hydrophilic. The film retention was 100%, indicating very good water resistance. No reduction in hydrophilicity was observed in the abrasion test. No scratches resulted under up to 50 g loading in the scratch test, indicating excellent durability. When the hydrophilic member was stacked one on top of another in the storage stability test, blocking (adhesion of the hydrophilic layer side of a hydrophilic member to the back side of the adjacent one) did not occur, showing excellent storage stability.

The photograph of FIG. 1 is the result of the anti fog test, showing no fogging. In the anti stain test, adhesion of carbon black was not at all observed. The transmittance was 88%, which was equal to that of the glass substrate. The hydrophilic layer suffered from no damage by any of the chemicals tested. The exposure to the accelerated weathering condition resulted no change in performance, proving excellent weatherability of the sample. The coating composition did not turned into gel for 6 months, proving stable.

Example 2

A hydrophilic glass member was produced in the same manner as in Example 1, except that the glass substrate was cleaned by UV ozone treatment and that the coating composition was applied by spin coating to form a hydrophilic layer having a dry thickness of 0.1 g/m$^2$. The resulting hydrophilic member was evaluated in the same manner as in Example 1 to give as good results as in Example 1.

Example 3

A hydrophilic glass member was produced in the same manner as in Example 1, except that the glass substrate was cleaned by UV ozone treatment, coated with the coating composition with a bar coater, spun on a spinner at 200 rpm for 300 seconds, and then dried to form a hydrophilic layer having a dry thickness of 15 g/m$^2$. The resulting hydrophilic member was evaluated in the same manner as in Example 1. As a result of the scratch test, no scratches were left under up to 100 g loading, indicating excellent durability. The results of evaluation were otherwise as good as in Example 1.

Example 4

A hydrophilic mirror member was produced in the same manner as in Example 1, except that a commercially available mirror was cleaned by UV ozone treatment and that the coating composition was applied thereto by spin coating to form a hydrophilic layer having a dry thickness of 0.1 g/m$^2$. The resulting hydrophilic mirror member was evaluated in the same manner as in Example 1 to give as good results including excellent anti fog properties as in Example 1.

Examples 5 and 6

A hydrophilic member was produced in the same manner as in Example 1, except for using each of the following catalysts. As a result of evaluation, the resulting hydrophilic members were both proved to be equal to the product of Example 1 in hydrophilicity, water resistance, durability scratch resistance, storage stability, anti fog/stain properties, visible light transmission, chemical resistance, weatherability, and coating composition stability with time.

Example 5

Ethylacetoacetatoaluminum Diisopropylate (ALCH, Available from Kawaken Fine Chemical Co., Ltd.)

Example 6 zirconium chelate compound prepared by stirring 50 parts of zirconium tetrabutoxide and 20 parts of ethyl acetoacetate in a reactor equipped with a stirrer at room temperature for 1 hour.

Examples 7 to 11

A hydrophilic member was produced in the same manner as in Example 1, except for using each of the following hydrophilic polymers. As a result of evaluation, all the hydrophilic members obtained were proved to be equal to the product of Example 1 in hydrophilicity, water resistance, durability, scratch resistance, storage stability, anti fog/stain properties, visible light transmission, chemical resistance, weatherability, and coating composition stability with time.

Example 7

Hydrophilic polymer 9

Example 8

Hydrophilic Polymer 13

Example 9

Hydrophilic Polymer 15

Example 10

Hydrophilic Polymer 24

Example 11

Hydrophilic Polymer 36

Example 12

Synthesis of Hydrophilic Polymer B with a Plurality of Reactive Groups (a) Synthesis of Amide Macromonomer In 200 g of ethanol were dissolved 100 g of acrylamide and 10 g of 3-mercaptopropionic acid. The solution was heated to 60° C., and 1 g of 2,2-azobisisobutyronitrile (thermal polymerization initiator) was added thereto, followed by allowing the system to react for 8 hours in a nitrogen atmosphere. After the reaction, the white precipitate formed was collected by filtration and thoroughly washed with methanol to yield 90 g of a carboxyl-terminated prepolymer (acid value: 0.80 meq/g; Mw: 1500). A 50 g portion of the prepolymer was dissolved in 150 g of dimethyl sulfoxide, and 20 g of glycidyl methacrylate, 1.2 g of N,N-dimethyldodecylamine (catalyst), and 0.2 g of hydroquinone (polymerization inhibitor) were added to the solution. The reaction system was allowed to react at 140° C. in a nitrogen atmosphere for 10 hours. The reaction solution was poured into acetone, and the thus precipitated polymer was collected and washed well to give 50 g of methacrylate-terminated acrylamide macromonomer (Mw: 1800). Introduction of a polymerizable group to the terminal was confirmed based on the olefin peaks of methacryloyl at 6.12 ppm and 5.70 ppm by $^1$H-NMR ($D_2O$) and a decrease of the acid value.

(b) Synthesis of Hydrophilic Graft Polymer B

In a flask containing 120 g of dimethyl sulfoxide was added dropwise a solution of 8 g of the macromonomer obtained in (a), 2 g of γ-methacryloxypropyltrimethoxysilane, and 0.2 g of 2,2-azobis[2-(2-imidazolin-2-yl)propane] (VA061, available from Wako Pure Chemical Industries, Ltd.) in 35 g of dimethyl sulfoxide at 60° C. over a period of 4 hours. After completion of the addition, heating was continued for an additional 6 hour period. The reaction solution was poured into acetone. The precipitated polymer was collected and washed well to afford 14 g of a hydrophilic polymer B having a plurality of reactive groups (Mw: 120,000) in a yield of 94%.

Example 13

A hydrophilic member was produced in the same manner as in Example 1, except for changing the drying conditions to 80° C. and 10 minutes. The resulting hydrophilic member was proved equal to the product of Example 1 in hydrophilicity, water resistance, durability, scratch resistance, storage stability, anti fog/stain properties, visible light transmission, chemical resistance, weatherability, and coating composition stability with time.

Comparative Example 1

Figure 2:
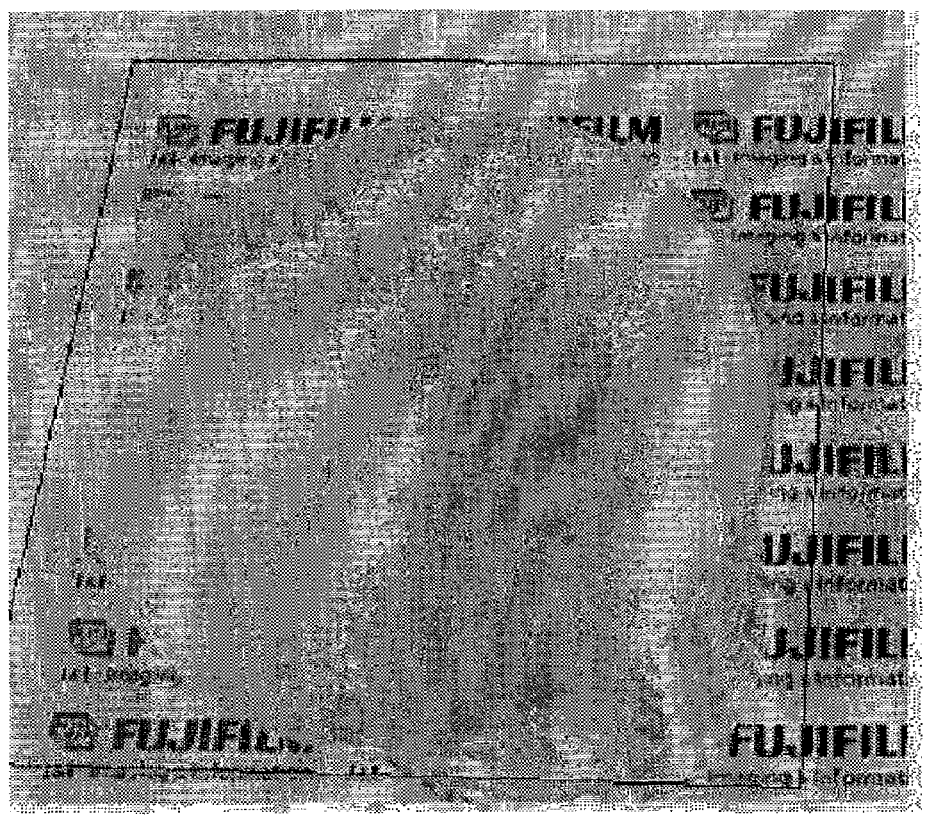
FIG. 2 is a photograph showing the anti fog properties of the hydrophilic member of Comparative Example 1.

A hydrophilic member was prepared in the same manner as in Example 1, except for using 1.5 g of a 1N nitric acid aqueous solution as a nitric acid catalyst. Compared with the hydrophilic member of Example 1, the resulting hydrophilic member suffered from reduction in hydrophilicity in the abrasion test and received scratches under a load of 15 g, proving insufficient in durability. Fogging occurred on the sample after the abrasion test as shown in the photograph of FIG. 2.

Comparative Example 2

A commercially available photocatalyst film (Hydrotect Film one year type (clear), available from Toto Ltd.) was irradiated with 20 J/cm$^2$ ultraviolet light to develop hydrophilicity. The UV-irradiated film was equal in hydrophilicity to the product of Example 1 but reduced in hydrophilicity after the abrasion test and suffered from scratches under a load of 5 g in the scratch test, proving inferior in durability.

Examples 14 to 23

Hydrophilic members were produced and evaluated in the same manner as in Examples 1 and 5 to 13, except for replacing the glass substrate with a 50 μm thick polyethylene terephthalate film having been hydrophilized by glow discharge treatment. All the resulting hydrophilic members were proved equal to the product of Example 1 in hydrophilicity, water resistance, durability, scratch resistance, storage stability, anti fog/stain properties, visible light transmission, chemical resistance, weatherability, and coating composition stability with time.

Comparative Example 3

A hydrophilic member was produced and evaluated in the same manner as in Comparative Example 1, except for replacing the glass substrate with a 50 μm thick polyethylene terephthalate film having been hydrophilized by glow discharge treatment. The results of evaluation showed that the hydrophilic member was equal to the product of Comparative Example 1.

Example 24

(a) Preparation of Hydrophilic Member

A hydrophilic member was prepared and evaluated in the same manner as in Example 1, except that the glass substrate was replaced with the same polyethylene terephthalate film as used in Examples 14 to 23 and that the coating composition further contained 1 g of 2-bromo-2-nitro-1,3-propanediol. The resulting hydrophilic member was proved equal to the product of Example 1 in surface free energy and visible light transmittance of the hydrophilic layer.

(b) Formation of Adhesive Layer

A commercially available acrylic emulsion adhesive (Emapol R-140, from Ipposha Oil Industries Co., Ltd.) was applied to the back side of the hydrophilic member to a dry thickness of about 18 μm and dried to form a pressure-sensitive adhesive layer.

(c) Formation of Release Layer

To 100 parts of a 50% solution of polyglycidyl methacrylate (polystyrene equivalent Mw: 12,000) in methyl ethyl ketone was added a solution of 150 parts of trimethylolpropane triacrylate (Aronix M-309, from To a Gosei Co. Ltd.), 6 parts of a photo radical polymerization initiator (Irgacure 184, from Ciba Geigy), 6 parts of a photo cationic polymerization initiator (Rhodosil 2074, from Rhodia), and 10 parts of Megafac 531A (from Dainippon Ink & Chemicals, Inc.) in 30 parts of methyl isobutyl ketone while stirring to prepare a coating composition for a release layer.

The coating composition was applied on the pressure-sensitive adhesive layer by extrusion coating to a thickness of 25 μm, dried, and irradiated with ultraviolet light (0.8 J/cm$^2$) to form a release layer.

(d) Evaluation

The resulting hydrophilic member was evaluated in the same manner as in Example 1 and also for antibacterial properties as follows.

Antibacterial activity on *Escherichia coli* (IFO 3301) and *Staphylococcus aureus* (IFO 12732) were evaluated by film contact method in accordance with the following procedure.
(1) Each strain was cultured on a broth agar medium at 37° C. for 20 hours and suspended in a 1/500 broth agar medium solution in a cell concentration of 2.0×10$^5$ cells/ml.
(2) Specimens having an area of 25 cm$^2$ were cut out of the hydrophilic member.
(3) The specimens were placed in the respective sterilized petri dishes, and 0.5 ml of the cell suspension was added. The dishes were sealed with cling film taking care so that the cell suspension might not adhere to the inner side of the film.
(4) The petri dishes were kept at 35° C. for 24 hours.
(5) After the incubation, the cell suspension was washed away with a sterilized buffered physiological saline. The number of viable cells in the washing was counted by the standard plate count method.

As a result of evaluation, the hydrophilic member of Example 24 was equal to that of Example in hydrophilicity, water resistance, durability, scratch resistance, storage stability, anti fog/stain properties, visible light transmission, chemical resistance, weatherability, and coating composition stability with time. In the antimicrobial test, the number of viable cells was zero, indicating no growth of the bacterial cells. Even after the sample was subjected to the water resistance test, the number of viable cells was zero in the same antimicrobial test, which proved high antibacterial activity of the hydrophilic member.

Examples 25 to 27

Hydrophilic members were produced in the same manner as in Example 24, except for replacing 2-bromo-2-nitro-1,3-propanediol with each of the following antimicrobial agents. The resulting hydrophilic members were equal to the product of Example 24 in antibacterial activity, hydrophilicity, water resistance, durability, scratch resistance, storage stability, anti fog/stain properties, visible light transmission, chemical resistance, weatherability, and coating composition stability with time.

Example 25

ZPT

Example 26

Silver Oxide-on-Silica Alumina (Atomy Ball from Catalysts & Chemicals Industries Co., Ltd.)

Example 27

Silver-on-Zirconium Phosphate (Novaron from Toa Gosei Co., Ltd.)

Example 28

A hydrophilic member was produced in the same manner as in Example 24, except for replacing the polyethylene terephthalate film with a float glass substrate. The resulting hydrophilic member was equal to the product of Example 24 in antibacterial activity, hydrophilicity, water resistance, durability, scratch resistance, storage stability, anti fog/stain properties, visible light transmission, chemical resistance, weatherability, and coating composition stability with time.

Examples 29 and 30

Hydrophilic members were produced in the same manner as in Example 24, except for using the catalysts used in Examples 5 and 6, respectively. The resulting hydrophilic members were equal to the product of Example 24 in antibacterial activity, hydrophilicity, water resistance, durability, scratch resistance, storage stability, anti fog/stain properties, visible light transmission, chemical resistance, weatherability, and coating composition stability with time.

Examples 31 to 33

A hydrophilic member was produced in the same manner as in Example 28, except for using each of the following hydrophilic polymers. The resulting hydrophilic members were equal to the product of Example 24 in antibacterial activity, hydrophilicity, water resistance, durability, scratch resistance, storage stability, fog/anti stain properties, visible light transmission, chemical resistance, weatherability, and coating composition stability with time.

Example 31

Hydrophilic Polymer 15

Example 32

Hydrophilic Polymer 24

Example 33

Hydrophilic Polymer with a Plurality of Reactive Groups, Represented by Formula

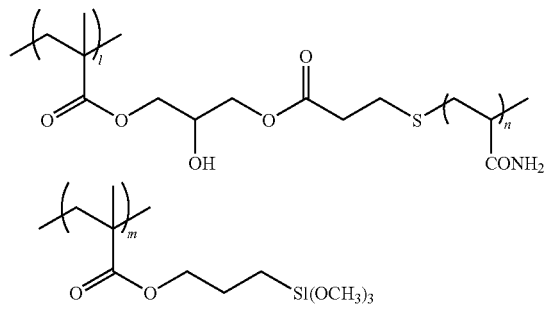

Comparative Example 4

A hydrophilic member was produced in the same manner as in Example 28, except for using a comparative coating composition containing a photocatalyst. The formulation of the coating composition is shown below.

The coating composition was applied with a wire bar and dried at 110° C. for 20 minutes to form a hydrophilic layer having a thickness of 0.5 g/m². The hydrophilic layer was irradiated with 20 J/cm² UV light to develop hydrophilicity and then evaluated. Although the resulting hydrophilic member was equal in hydrophilicity to the product of Example 28, the antimicrobial test results showed that the number of viable cells was $2 \times 10^3$ cells/ml, indicating inferior antibacterial activity. After the water resistance test, the film retention was 85%, and the antibacterial activity was further reduced, as represented by the number of viable cells of $5 \times 10^4$ cell/ml, indicating inferior durability of the hydrophilic layer.
Formulation of Comparative Coating Composition:

| | |
|---|---|
| Titanium oxide sol photocatalyst ST-K211 (Ishihara Sangyo Kaisha, Ltd.; solid content: 0.2%) | 500 g |
| 2-Bromo-2-nitro-1,3-propanediol | 0.02 g |

This application is based on Japanese Patent application JP 2005-332947, filed Nov. 17, 2005, Japanese Patent application JP 2005-333179, filed Nov. 17, 2005, Japanese Patent application JP 2006-44368, filed Feb. 21, 2006, and Japanese Patent application JP 2006-256215, filed Sep. 21, 2006, the entire contents of which are hereby incorporated by reference, the same as if set forth at length.

The invention claimed is:

1. A hydrophilic member comprising a substrate and a hydrophilic coating film provided on the substrate, wherein the hydrophilic coating film includes a cross-linked structure produced by hydrolysis and polycondensation with an aqueous solution containing (a) a hydrophilic polymer, (b) an alkoxide of a metal selected from the group consisting of Si, Ti, Zr, and Al, and (c) a metal complex catalyst.

2. The hydrophilic member according to claim 1, wherein the metal complex catalyst is formed of a metal element selected from the group consisting of the groups 2A, 3B, 4A and 5A of the Periodic Table and an oxo- or hydroxyl oxygen-containing compound selected from the group consisting of a β-diketone, a keto ester, a hydroxycarboxylic acid and an ester thereof, an amino alcohol, and an enol type active hydrogen compound.

3. The hydrophilic member according to claim 1, wherein the substrate is a glass substrate or a plastic substrate.

4. The hydrophilic member according to claim 1, wherein the aqueous solution further contains an antimicrobial agent.

5. The hydrophilic member according to claim 1, wherein the hydrophilic polymer comprises at least one of a polymer represented by the following formula (I) and a polymer represented by the following formula (II):

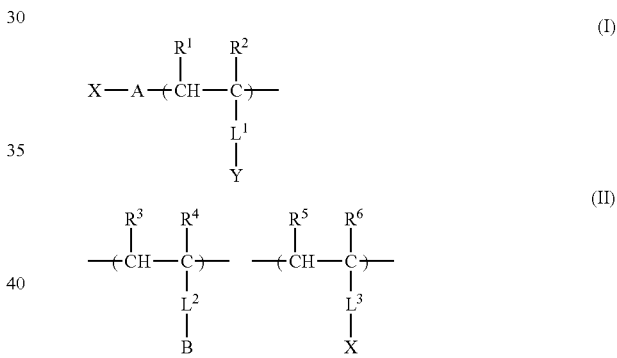

wherein $R^1$, $R^2$, $R^3$, $R^4$, $R^5$, and $R^6$ each independently represent a hydrogen atom or a hydrocarbon group having from 1 to 8 carbon atoms; X represents a reactive group; A, $L^1$, $L^2$, and $L^3$ each independently represent a single bond or a linking group; Y represents $-NHCOR^7$, $-CON(R^7)_2$, $-COR^7$, $-OH$, $-CO_2M$, $-SO_3M$, $-PO_3M$, $-OPO_3M$ or $-N(R^7)_3 \ Z^1$ in which $R^7$ represents an alkyl group having from 1 to 18 carbon atoms, an aryl group having from 6 to 18 carbon atoms or an aralkyl group having from 7 to 18 carbon atoms; M represents a hydrogen atom, an alkali metal, an alkaline earth metal or an onium group; and $Z^1$ represents a halide ion; and B represents a partial structure represented by the following formula (III):

wherein $R^1$ and $R^2$ each independently represent a hydrogen atom or a hydrocarbon group having from 1 to 8 carbon atoms; $L^1$ represent a single bond or a linking group; and Y represents —NHCOR$^7$, —CONH$_2$, —CON(R$^7$)$_2$, —COR$^7$, —OH, —CO$_2$M, —SO$_3$M, —PO$_3$M, —OPO$_3$M or —N(R$^7$)$_3$Z$^1$ in which $R^7$ represents an alkyl group having from 1 to 18 carbon atoms, an aryl group having from 6 to 18 carbon atoms or an aralkyl group having from 7 to 18 carbon atoms; M represents a hydrogen atom, an alkali metal, an alkaline earth metal or an onium group; and $Z^1$ represents a halide ion.

6. The hydrophilic member according to claim 1, which is automotive glass.

7. The hydrophilic member according to claim 1, which is architectural glass.

8. A process for producing a hydrophilic member, comprising:
   coating a substrate with an aqueous solution containing (a) a hydrophilic polymer, (b) an alkoxide of a metal selected from the group consisting of Si, Ti, Zr, and Al, and (c) a metal complex catalyst; and
   heat-drying the solution applied to form a hydrophilic coating film on the substrate.

* * * * *